(12) United States Patent
Bhattacharjee et al.

(10) Patent No.: US 9,910,891 B2
(45) Date of Patent: *Mar. 6, 2018

(54) DEFERRING DATA RECORD CHANGES USING QUERY REWRITING

(71) Applicant: International Business Machines Corporation, Armonk, NY (US)

(72) Inventors: Bishwaranjan Bhattacharjee, Yorktown Heights, NY (US); Mustafa Canim, Ossing, NY (US); Mohammad S. Hamedani, White Plains, NY (US); Kenneth A. Ross, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 446 days.

This patent is subject to a terminal disclaimer.

(21) Appl. No.: 14/036,780

(22) Filed: Sep. 25, 2013

(65) Prior Publication Data

US 2015/0074041 A1    Mar. 12, 2015

Related U.S. Application Data

(63) Continuation of application No. 14/020,076, filed on Sep. 6, 2013.

(51) Int. Cl.
    *G06F 17/30*    (2006.01)
(52) U.S. Cl.
    CPC .. *G06F 17/30448* (2013.01); *G06F 17/30592* (2013.01)
(58) Field of Classification Search
    None
    See application file for complete search history.

(56) References Cited

U.S. PATENT DOCUMENTS 7,117,215 B1 * 10/2006 Kanchwalla ...... G06F 17/30592
                                                      707/602
7,685,181 B2    3/2010 Bhattacharjee et al.
(Continued)

OTHER PUBLICATIONS

Athanassoulis et al., "MaSM: Efficient Online Updates in Data Warehouses", Proceedings of the 2011 ACM SIGMOD International Conference on Management of Data (SIGMOD '11), Jun. 2011, pp. 865-876.

(Continued)

*Primary Examiner* — Soheila (Gina) Davanlou
(74) *Attorney, Agent, or Firm* — Yee & Associates, P.C.; Yeen Tham

(57) ABSTRACT

Staging data record changes from a faster storage medium to a slower storage medium using data query rewriting is provided. In response to receiving a data query corresponding to a particular data record, it is determined whether the data query is one of a transactional data query or an analytical data query. In response to determining that the data query is a transactional data query, the transactional data query is rewritten to apply transactional delta changes to the particular data record on a storage-class memory of a computer. In response to determining that the data query is an analytical data query, the analytical data query is rewritten to select and reconcile each data record corresponding to the particular data record stored on the storage-class memory with the particular data record stored on a persistent data storage device of the computer.

16 Claims, 12 Drawing Sheets

(56) References Cited

U.S. PATENT DOCUMENTS

| | | | |
|---|---|---|---|
| 7,895,190 B2 | 2/2011 | Joseph | |
| 8,161,015 B2 | 4/2012 | Kennedy et al. | |
| 2005/0267914 A1* | 12/2005 | Moore | G06F 17/30377 |
| 2006/0259728 A1* | 11/2006 | Chandrasekaran | G06F 3/0605 711/170 |
| 2008/0104133 A1* | 5/2008 | Chellappa | G06F 17/30581 |
| 2008/0208802 A1 | 8/2008 | Bhattacharjee et al. | |
| 2010/0262633 A1* | 10/2010 | Bhattacharjee | G06F 17/30312 707/812 |
| 2012/0109936 A1* | 5/2012 | Zhang | G06F 17/30312 707/713 |
| 2012/0323884 A1* | 12/2012 | Draese | G06F 17/30424 707/713 |
| 2012/0330925 A1 | 12/2012 | Ramamurthy et al. | |
| 2013/0110881 A1* | 5/2013 | Bender | G06F 17/30592 707/792 |
| 2013/0124780 A1 | 5/2013 | Baderdinni et al. | |
| 2014/0280375 A1* | 9/2014 | Rawson | G06F 17/30289 707/803 |
| 2015/0074040 A1 | 3/2015 | Bhattacharjee et al. | |

OTHER PUBLICATIONS

Bhattacharjee et al., "Efficient Bulk Deletes for Multi Dimensional Clustered Tables in DB2", Proceedings of the 33rd International Conference on Very Large Databases, Sep. 2007, pp. 1197-1206.

Bhattacharjee et al., "Efficient Index Compression in DB2 LUW," Proceedings of the VLDB Endowment, vol. 2, No. 2, Aug. 2009, pp. 1462-1473.

Bhattacharjee et al., "Enhancing Recovery Using an SSD Buffer Pool Extension," Proceedings of the Seventh International Workshop on Data Management on New Hardware (DaMoN 2011), Jun. 2011, pp. 10-16.

Bhattacharjee et al., "Managing a Multi-Version Database," U.S. Appl. No. 13/904,219, filed May 29, 2013, 67 pages.

Bhattacharjee et al., "Managing a Multi-Version Database," U.S. Appl. No. 13/969,537, filed Aug. 17, 2013, 66 pages.

Canim et al. "An Object Placement Advisor for DB2 Using Solid State Storage," Proceedings of the VLDB Endowment vol. 2, No. 2, Aug. 2009, pp. 1318-1329.

Canim et al. "SSD Bufferpool Extensions for Database Systems," Proceedings of the VLDB Endowment vol. 3, No. 1-2, Sep. 2010, pp. 1435-1446.

Chaudhuri et al., "An Efficient Cost-Driven Index Selection Tool for Microsoft SQL Server," Proceedings of the 23rd International Conference on Very Large Data Bases (VLDB '97), Aug. 1997, pp. 146-155.

Chaudhuri et al., "Automating Statistics Management for Query Optimizers," IEEE Transactions on Knowledge and Data Engineering, vol. 13, No. 1, Jan./Feb. 2001, 10 pages.

Do et al. "Turbocharging DBMS Buffer Pool Using SSDs," Proceedings of the 2011 ACM SIGMOD International Conference on Management of Data (SIGMOD '11), Jun. 2011, pp. 1113-1124.

"Fusion-io Breaks One Billion IOPS Barrier," Fusion-io, Inc., Jan. 5, 2012, 2 pages. http://www.fusionio.com/press-releases/fusion-io-breaks-one-billion-iops-barrier/.

Grund et al., "An overview of HYRISE—a Main Memory Hybrid Storage Engine," Bulletin of the Technical Committee on Data Engineering, vol. 35, No. 1, Mar. 2012, pp. 52-57.

Hamedani et al., "Log Data Store that Stores Data Across a Plurality of Storage Devices Using Non-Disjoint Layers," U.S. Appl. No. 13/973,413, filed Aug. 22, 2013, 62 pages.

Kang et al., "Flash-Based Extended Cache for Higher Throughput and Faster Recovery," Proceedings of the VLDB Endowment, vol. 5, No. 11, Jul. 2012, pp. 1615-1626.

Levandoski et al., "The Bw-Tree: A B-tree for New Hardware Platforms", Proceedings of the 29th IEEE International Conference on Data Engineering (ICDE 2013), Apr. 2013, 12 pages.

Severance et al., "Differential Files: Their Application to the Maintenance of Large Databases", ACM Transactions on Database Systems, vol. 1, No. 3, Sep. 1976, pp. 256-267.

Sikka et al., "Efficient Transaction Processing in SAP HANA Database—The End of a Column Store Myth," Proceedings of the 2010 ACM SIGMOD International Conference on Management of Data (SIGMOD '12), May 2010, pp. 731-741.

Bhattacharjee et al., "Deferring Data Record Changes Using Query Rewriting," U.S. Appl. No. 14/020,076, filed Sep. 6, 2013, 52 pages.

Office Action, dated Mar. 7, 2016, regarding U.S. Appl. No. 14/020,076, 29 pages.

Final Office Action, dated Sep. 7, 2016, regarding U.S. Appl. No. 14/020,076, 25 pages.

Notice of Allowance, dated Oct. 16, 2017, regarding U.S. Appl. No. 14/020,076, 14 pages.

* cited by examiner

DEFERRING DATA RECORD CHANGES USING QUERY REWRITING

This application is a continuation of prior U.S. patent application Ser. No. 14/020,076 filed on Sep. 6, 2013.

BACKGROUND

1. Field

The disclosure relates generally to querying data records and more specifically to rewriting data queries to defer data record changes using a fast data storage medium.

2. Description of the Related Art

Supporting analytical-type data queries in conjunction with online transaction processing (OLTP) workloads that are update-intensive have historically been problematic. One possible approach is to reduce the number of indexes when faced with update-intensive online transaction processing workloads. However, this approach makes it more difficult to efficiently process analytical-type data queries and to locate data records based on secondary attributes. These capabilities of efficiently processing analytical-type data queries and locating data records based on secondary attributes are often important for operational data stores. For example, it is not uncommon to find tens of indexes to improve analytical and decision-making data queries.

SUMMARY

According to one illustrative embodiment, a computer system for staging data record changes from a faster storage medium to a slower storage medium using data query rewriting is provided. In response to receiving a data query corresponding to a particular data record, it is determined whether the data query is one of a transactional data query or an analytical data query. In response to determining that the data query is a transactional data query, the transactional data query is rewritten to apply transactional delta changes to the particular data record on a storage-class memory of the computer system. In response to determining that the data query is an analytical data query, the analytical data query is rewritten to select and reconcile each data record corresponding to the particular data record stored on the storage-class memory with the particular data record stored on a persistent data storage device of the computer system. According to another illustrative embodiment, a computer program product for staging data record changes from a faster storage medium to a slower storage medium using data query rewriting also is provided.

DETAILED DESCRIPTION

Figure 1:
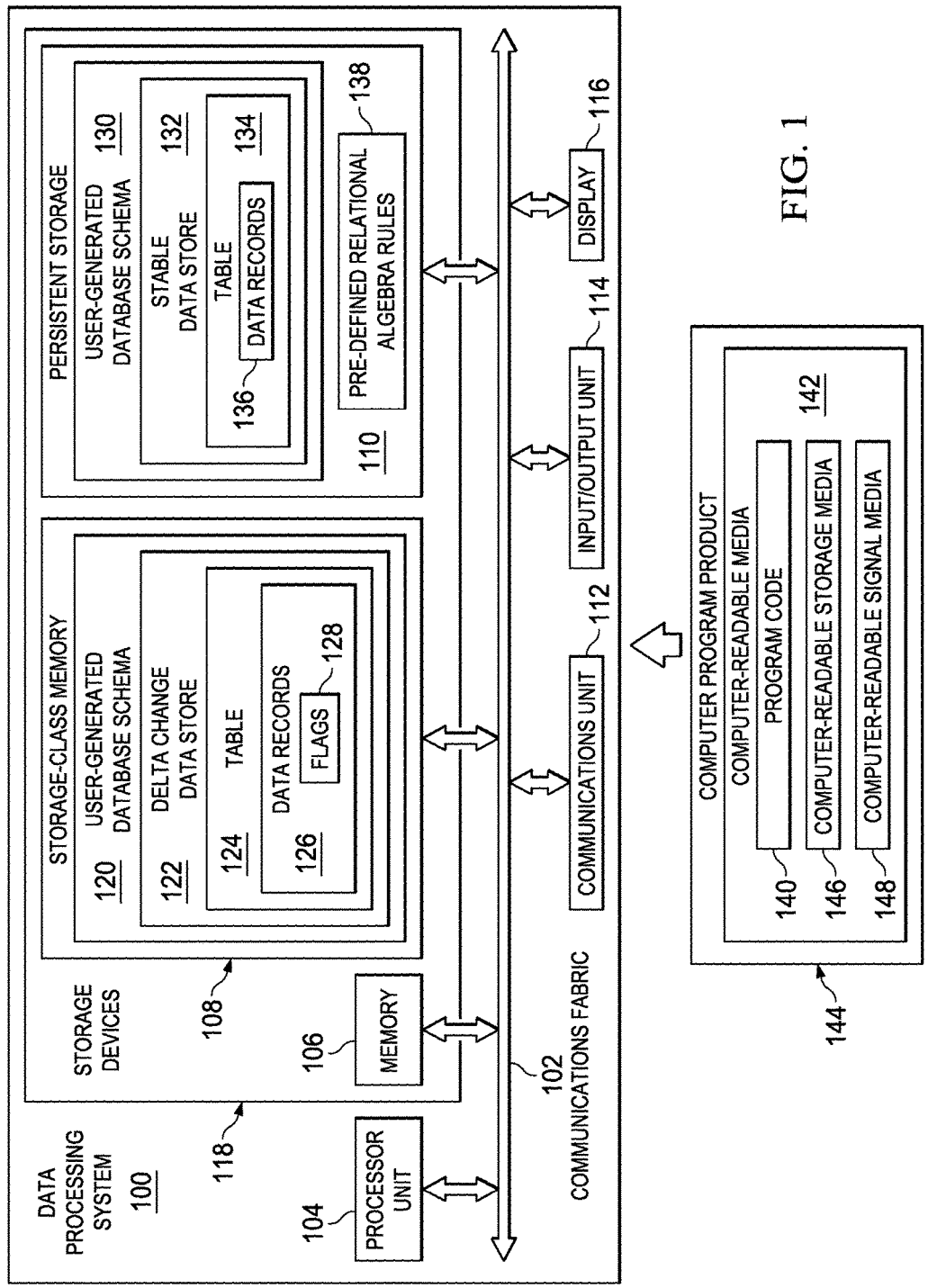
FIG. 1 is a diagram of a data processing system in which illustrative embodiments may be implemented.

As will be appreciated by one skilled in the art, aspects of the illustrative embodiments may be embodied as a computer system or computer program product. Accordingly, aspects of the illustrative embodiments may take the form of an entirely hardware embodiment, an entirely software embodiment (including firmware, resident software, microcode, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium does not include a propagation medium, such as a signal or carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of computer systems and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
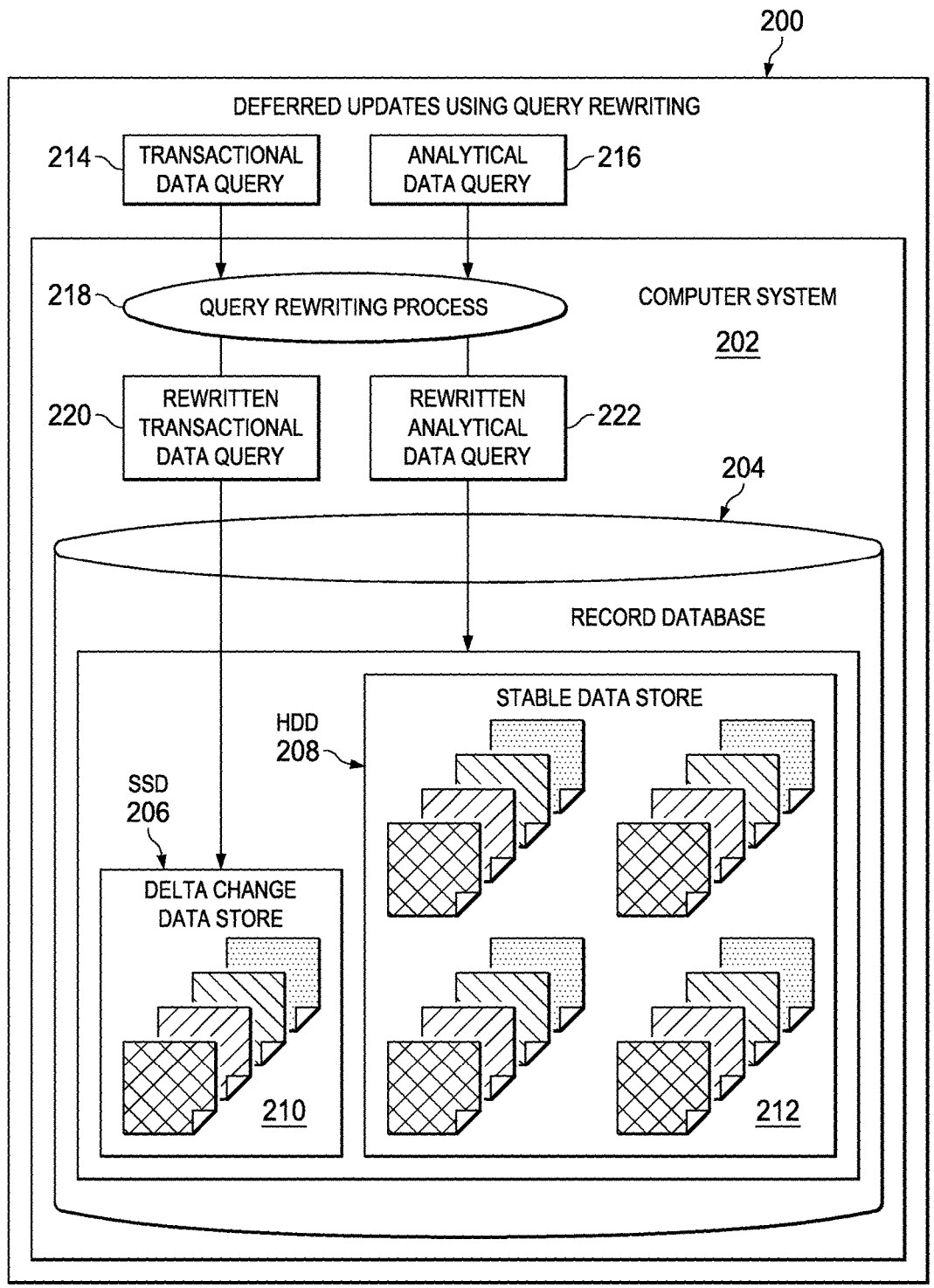
FIG. 2 is a diagram illustrating deferred data record updates using query rewriting in accordance with an illustrative embodiment.

With reference now to the figures, and in particular, with reference to FIGS. 1 and 2, diagrams of data processing environments are provided in which illustrative embodiments may be implemented. It should be appreciated that FIGS. 1 and 2 are only meant as examples and are not intended to assert or imply any limitation with regard to the environments in which different embodiments may be implemented. Many modifications to the depicted environments may be made.

FIG. 1 depicts a diagram of a data processing system in accordance with an illustrative embodiment. Data processing system 100 is an example of a computer device in which computer readable program code or instructions implementing processes of illustrative embodiments may be located. Data processing system 100 may be, for example, a server computer or a client computer connected to a network, such as a local area network, a wide area network, an intranet, an internet, or the Internet. In this illustrative example, data processing system 100 includes communications fabric 102, which provides communications between processor unit 104, memory 106, storage-class memory (SCM) 108, persistent storage 110, communications unit 112, input/output (I/O) unit 114, and display 116.

Processor unit 104 serves to execute instructions for software applications or programs that may be loaded into memory 106. Processor unit 104 may be a set of one or more processors or may be a multi-processor core, depending on the particular implementation. Further, processor unit 104 may be implemented using one or more heterogeneous processor systems, in which a main processor is present with secondary processors on a single chip. As another illustrative example, processor unit 104 may be a symmetric multi-processor system containing multiple processors of the same type.

Memory 106, storage-class memory 108, and persistent storage 110 are examples of computer readable storage devices 118. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium, such as a signal or carrier wave. Memory 106, in this example, may be a main memory device, such as a dynamic random access memory (DRAM), or any other suitable volatile or non-volatile storage device, of data processing system 100.

Storage-class memory 108 may be, for example, a phase change memory (PCM) and/or a solid-state drive (SSD). A phase change memory is a non-volatile solid-state data storage memory device employing phase change materials that change between two states, namely an amorphous state and a poly-crystalline state. A solid-state drive uses integrated circuit assemblies as memory to store data persistently. Storage-class memory 108 uses electronic interfaces compatible with memory 106 and persistent storage 110. Storage-class memory 108 has lower access time and less latency than persistent storage 110.

In this example, storage-class memory 108 includes user-generated database schema 120 and delta change data store 122. User-generated database schema 120 is a structure for organizing stored data records within a database and is created by a user of data processing system 100. User-generated database schema 120 may be, for example, a relational database schema. However, it should be noted that user-generated database schema 120 may represent any type of schema, such as a row-based schema, a column-based schema, or any other schema format. Delta change data store 122 is a data storage area that stores recent changes to data records, such as data records 126, within table 124. The recent changes to data records may be, for example, insertions of new data records, updates to data records, and/or deletions of data records. The data records may represent any type of recorded data. For example, the data records may be associated with a monitoring application that receives a multitude of readings at a very rapid pace from thousands of sensors. In other words, the stored data records within delta change data store 122 may change often (i.e., updated rapidly and frequently).

In addition, data records 126 include flags 128. Each data record in data records 126 has a corresponding flag. Flags 128 are delete flags that indicate whether a corresponding data record is to be deleted or not. For example, a flag may be set to true, which indicates that a corresponding data record is to be deleted. Alternatively, a flag may be set to false, which indicates that the corresponding data record is not to be deleted. Flags 128 may be, for example, Boolean attributes added to a data record. Alternatively, flags 128 may be bits added to a data record.

Persistent storage 110 may take various forms, depending on the particular implementation. For example, persistent storage 110 may contain one or more devices. For example, persistent storage 110 may be a magnetic hard disc drive (HDD), a flash memory, a rewritable optical disk, a rewritable magnetic tape drive, or some combination of the above. The media used by persistent storage 110 may be removable. For example, a removable hard disc drive may be used for persistent storage 110.

In this example, persistent storage 110 includes user-generated database schema 130 and stable data store 132. User-generated database schema 130 is identical or substantially the same as user-generated database schema 122. In other words, data processing system 100 applies the same database schema to both delta change data store 122 and stable data store 132.

Stable data store 132 is a data storage area that stores a plurality of data records, such as data records 136, within table 134. Data records 136 represent previous versions of data records that are currently stored on delta change data store 122 and/or data records that were previously stored on delta change data store 122. In other words, data records 136 represent data records that data processing system 100 pushes from delta change data store 122 to stable data store 132 after, for example, a predetermined time interval expires, a number of data records stored within delta change data store 122 exceeds a predetermined threshold number of data records, or an occurrence of a predefined event.

Also in this example, persistent storage 110 stores pre-defined relational algebra rules 138. Pre-defined relational algebra rules 138 represent a plurality of relational algebra rules that were previously defined by the user of data processing system 100 to rewrite data queries received by data processing system 100. Pre-defined relational algebra rules 138 are rules for performing different types of data query operations, such as data record select, data record insert, data record update, and data record delete operations. Data processing system 100 utilizes a different relational algebra rule for each different data query operation.

Relational algebra is a formal description of how a relational database operates. In other words, relational algebra is a mathematical expression that underpins standard query language (SQL) operations. In order to implement a database management system, a set of rules must exist that state how a database is to operate. For example, when a user wants to insert a new data record within a table of the database, a set of rules must exist to ensure that the database management system inserts the new data record as the user expects.

Communications unit 112, in this example, provides for communication with other data processing systems and computing devices. Communications unit 112 may provide communications through the use of either or both physical and wireless communications links. The physical communications link may utilize, for example, a wire, cable, universal serial bus, or any other physical technology to establish a physical communications link for data processing system 100. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 100.

Input/output unit 114 allows for the input and output of data with other devices that may be connected to data processing system 100. For example, input/output unit 114 may provide a connection for user input through a keypad, a keyboard, a mouse, and/or some other suitable input device. Display 116 provides a mechanism to display information to a user. In addition, display 116 may provide touch screen capabilities.

Instructions for the operating system, applications, and/or programs may be located in storage devices 118, which are in communication with processor unit 104 through communications fabric 102. In this illustrative example, the instructions are in a functional form on persistent storage 110. These instructions may be loaded into memory 106 for running by processor unit 104. The processes of the different embodiments may be performed by processor unit 104 using computer implemented instructions, which may be located in a main memory, such as memory 106. These instructions are referred to as program code, computer usable program code, or computer readable program code that may be read and run by a processor in processor unit 104. The program code, in the different embodiments, may be embodied on different physical computer readable storage devices, such as memory 106, storage-class memory 108, or persistent storage 110.

Program code 140 is located in a functional form on computer readable media 142 that is selectively removable and may be loaded onto or transferred to data processing system 100 for running by processor unit 104. Program code 140 and computer readable media 142 form computer program product 144. In one example, computer readable media 142 may be computer readable storage media 146 or computer readable signal media 148. Computer readable storage media 146 may include, for example, an optical or magnetic disc that is inserted or placed into a drive or other device that is part of persistent storage 110 for transfer onto a storage device, such as a magnetic hard disc drive, that is part of persistent storage 110. Computer readable storage media 146 also may take the form of a persistent storage device, such as a hard drive, a thumb drive, or a flash memory that is connected to data processing system 100. In some instances, computer readable storage media 146 may not be removable from data processing system 100.

Alternatively, program code 140 may be transferred to data processing system 100 using computer readable signal media 148. Computer readable signal media 148 may be, for example, a propagated data signal containing program code 140. For example, computer readable signal media 148 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 140 may be downloaded over a network to persistent storage 110 from another device or data processing system through computer readable signal media 148 for use within data processing system 100. For instance, program code stored in a computer readable storage media in a server data processing system may be downloaded over a network from the server to data processing system 100. The data processing system providing program code 140 may be a server computer, a client computer, or some other device capable of storing and transmitting program code 140.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a computer readable storage device in data processing system 100 is any hardware apparatus that may store data. Memory 106, storage-class memory 108, persistent storage 110, and computer readable storage media 146 are examples of physical computer readable storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

In the course of developing illustrative embodiments, it was discovered that the overhead associated with changes to data records needs to be reduced so that indexes may be effectively used for analytical data query processing without being a heavy burden on transactional data query throughput. To address this need, illustrative embodiments utilize a solid-state storage device layer within a data storage hierarchy. Based on current technologies, solid-state drives are orders of magnitude faster than magnetic hard disk drives for small random data access inputs/outputs. However, per gigabyte, solid-state disk drives are more expensive than magnetic hard disk drives. As a result, it pays to store the bulk of data records on the magnetic hard disk drive and reserve the solid-state drive for data records that can benefit the most from utilizing the faster storage medium, such as, for example, data records that are accessed frequently and randomly.

Unlike previous approaches, illustrative embodiments do not simply store "hot" data records on the solid-state drive. Instead, illustrative embodiments utilize a query rewriting process to extend the data storage hierarchy by employing a data record staging area on the solid-state drive to absorb the cost of data record update transactions and to periodically batch these data record updates to the hard disk drive. Because the solid-state drive is a faster storage medium than the hard disk drive, illustrative embodiments are able to efficiently process these transactions that change the data records. Using the query rewriting process, illustrative embodiments decrease the number of magnetic hard disk drive input/outputs that are needed for updating the data records and indexes. In addition, illustrative embodiments only require solid-state drive input/outputs for data record insertions, deletions, and updates. It should be noted that even though illustrative embodiments are described in terms of utilizing a solid-state drive, illustrative embodiments are not limited to such. For example, alternative illustrative embodiments may utilize an auto-commit memory (ACM) with smaller input/output granularities that may provide even better performance.

To support efficient data record changes by leveraging the presence of a solid-state drive as part of the data storage hierarchy, illustrative embodiments defer the data record changes by only maintaining the recent data record changes entirely on the solid-state drive while storing the more stable portion of the data records on the magnetic hard disk drive. This approach enables illustrative embodiments to efficiently store recent data record updates on the solid-state drive and to only periodically merge the data record content of the solid-state drive with the data record content of the hard disk drive in batches, thereby amortizing disk update cost. Furthermore, illustrative embodiments are declaratively implemented through query rewriting without changing the database program; thus, providing a cost-effective and non-intrusive process for supporting faster data record updates.

Deferring data record updates is in contrast with static pre-allocation of database objects to either the solid-state drive or the hard disk drive because illustrative embodiments utilize the deferred data record updates by dynamically allocating only recent data record changes to the solid-state drive. This deferred data record update scheme of illustrative embodiments also differs from extending the buffer pool size for dynamically caching hot pages, in which solid-state drive buffer pool pages are an identical copy of pages stored on the hard disk drive. However, when illustrative embodiments defer data record updates, the data record content of the solid-state drive and the data record content of the hard disk drive are strictly different.

The data query rewriting process of illustrative embodiments: 1) supports the complete class of transactional data query operations, such as insert, update, and delete; 2) enables batching of data record updates and sequential writes by periodically pushing the stored data record updates on the solid-state drive to the hard disk drive; 3) exploits a full range of data access patterns, such as, for example, scan, hash-join, merge-join, and index lookup, as part of data query optimization; 4) eliminates the need to modify the database program, which is a non-intrusive approach; 5) utilizes the solid-state drive by providing a faster storage medium for data record storage and lookup during data queries and exploits both the fast random (index lookup) and sequential (table scan) read accesses; 6) extends the deferred data record updates to support a multi-version database by retaining all data record updates and deletes and by maintaining a secondary storage structure on the solid-state drive to store the most recent version of each data record; and 7) employs a hybrid locking process that includes: a) a lockfree disk access, which does not lock individual data records on the hard disk drive, but locks the entire table on the hard disk drive when batching data record updates to the hard disk drive from the solid-state drive; and b) traditional locking of individual data records on solid-state drive when a user updates or deletes data records stored on the solid-state drive.

The deferred data record update scheme of illustrative embodiments also may be viewed as extending a database persistent storage hierarchy, which is conceptually similar to extending a buffer pool. In this extended database persistent storage model, illustrative embodiments store and manage on the solid-state drive either the working set of data records (i.e., data records that are changed frequently) or the tail of the table. Illustrative embodiments implement this model either through non-materialized views (query rewriting) or through table partitioning (maintaining the latest active partition on the solid-state drive). Both of these approaches provide consistent and transparent views of the database to the user. Thus, illustrative embodiments hide the underlying storage model from both the user and the database program.

In addition, utilizing the query rewriting approach provides more flexibility in terms of physical representation. For example, illustrative embodiments may store the updatable data records on the solid-state drive as a row-based data structure representation and store the data records on the hard disk drive as a column-based data structure representation. Further, illustrative embodiments may transparently leverage other existing data structure representations, such as a multi-version or bi-temporal data structure representation.

Query rewriting for select, insert, update, and delete data query operations, which are expressed in relational algebra expressions, minimizes the number of hard disk drive input/output accesses. The query rewriting of illustrative embodiments assumes roughly an identical database schema on both the hard disk drive and the solid-state drive. Illustrative embodiments define a relational database schema as a finite set of tables. Each table contains a collection of columns. Illustrative embodiments assume a single relation key for each column. If no explicit relation key is defined, then the name of the column is the relation key. Each column in a table has a unique name and is assigned a fixed position in the table.

An instance over the relational database schema is a function that assigns to each table a finite set of data records. Illustrative embodiments define the relational database schema on the solid-state drive such that for every table residing on the hard disk drive there is corresponding table on the solid-state drive. When a data record on the solid-state drive has a corresponding flag indicating that the data record should be deleted, then the data record must be removed from the table on the hard disk drive if the data record exists on the hard disk drive.

Thus, illustrative embodiments provide a computer system and computer program product for staging data record changes from a faster storage medium to a slower storage medium using data query rewriting. In response to a computer receiving a data query corresponding to a particular data record, the computer determines whether the data query is one of a transactional data query or an analytical data query. In response to the computer determining that the data query is a transactional data query, the computer rewrites the transactional data query to apply transactional delta changes to the particular data record on a storage-class memory of the computer. In response to the computer determining that the data query is an analytical data query, the computer rewrites the analytical data query to select and reconcile each data record corresponding to the particular data record stored on the storage-class memory with the particular data record stored on a persistent data storage device of the computer.

With reference now to FIG. 2, a diagram illustrating deferred data record updates using query rewriting is depicted in accordance with an illustrative embodiment. Deferred updates using query rewriting 200 is implemented in computer system 202. Computer system 202 may be, for example, data processing system 100 in FIG. 1. Computer system 202 includes record database 204, which is comprised of solid-state drive 206 and hard disk drive 208. Solid-state drive 206 and hard disk drive 208 may be, for example, storage-class memory 108 and persistent storage 110 in FIG. 1, respectively.

Solid-state drive 206 includes delta change data store 210. Delta change data store 210 may be, for example, delta change data store 122 in FIG. 1. Delta change data store 210 is a data storage area that stores recent changes to data records, such as updates and deletes, and/or recent data record inserts. Delta change data store 210 may store the updates, deletes, and inserts of data records in a table, such as table 124 in FIG. 1. Hard disk drive 208 includes stable data store 212. Stable data store 212 may be, for example, stable data store 132 in FIG. 1. Stable data store 212 is a data storage area that stores data records that computer system 202 pushes from delta change data store 210 to stable data store 212 at the expiration of a predetermined time interval, when a number of data records stored within delta change data store 122 exceeds a predetermined threshold number of data records, or when a predefined event occurs, for example. Stable data store 212 may store the data records in a table, such as table 134 in FIG. 1.

Computer system 202 receives data queries, such as transactional data query 214 and analytical data query 216, to perform operations on data records within records database 204. Transactional data query 214 may be, for example, an insert data query, an update data query, or a delete data query. Analytical data query 216 may be, for example, a select data query.

Computer system 202 utilizes query rewriting process 218 to rewrite the received data queries. For example, computer system 202 utilizes query rewriting process 218 to rewrite transactional data query 214 to generate rewritten transactional data query 220. Similarly, computer system 202 utilizes query rewriting process 218 to rewrite analytical data query 216 to generate rewritten analytical data query 222. Query rewriting process 218 utilizes pre-defined relational algebra rules, such as pre-defined relational algebra rules 138 in FIG. 1, to generate rewritten transactional data query 220 and rewritten analytical data query 222.

Computer system 202 issues rewritten transactional data query 210 to record database 204. However, it should be noted that query rewriting process 218 rewrites transactional data query 214 so that all transactional data queries, such as inserts, updates, and deletes, are only applied to delta change data store 210 on solid-state drive 206. Similarly, computer system 202 issues rewritten analytical data query 222 to record database 204. It should be noted that query rewriting process 218 rewrites analytical data query 216 so that all analytical data queries, such as select data queries, are applied to both delta change data store 210 on solid-state drive 206 and stable data store 212 on hard disk drive 208 to reconcile different versions of data records associated with a particular analytical data query.

Figure 3:
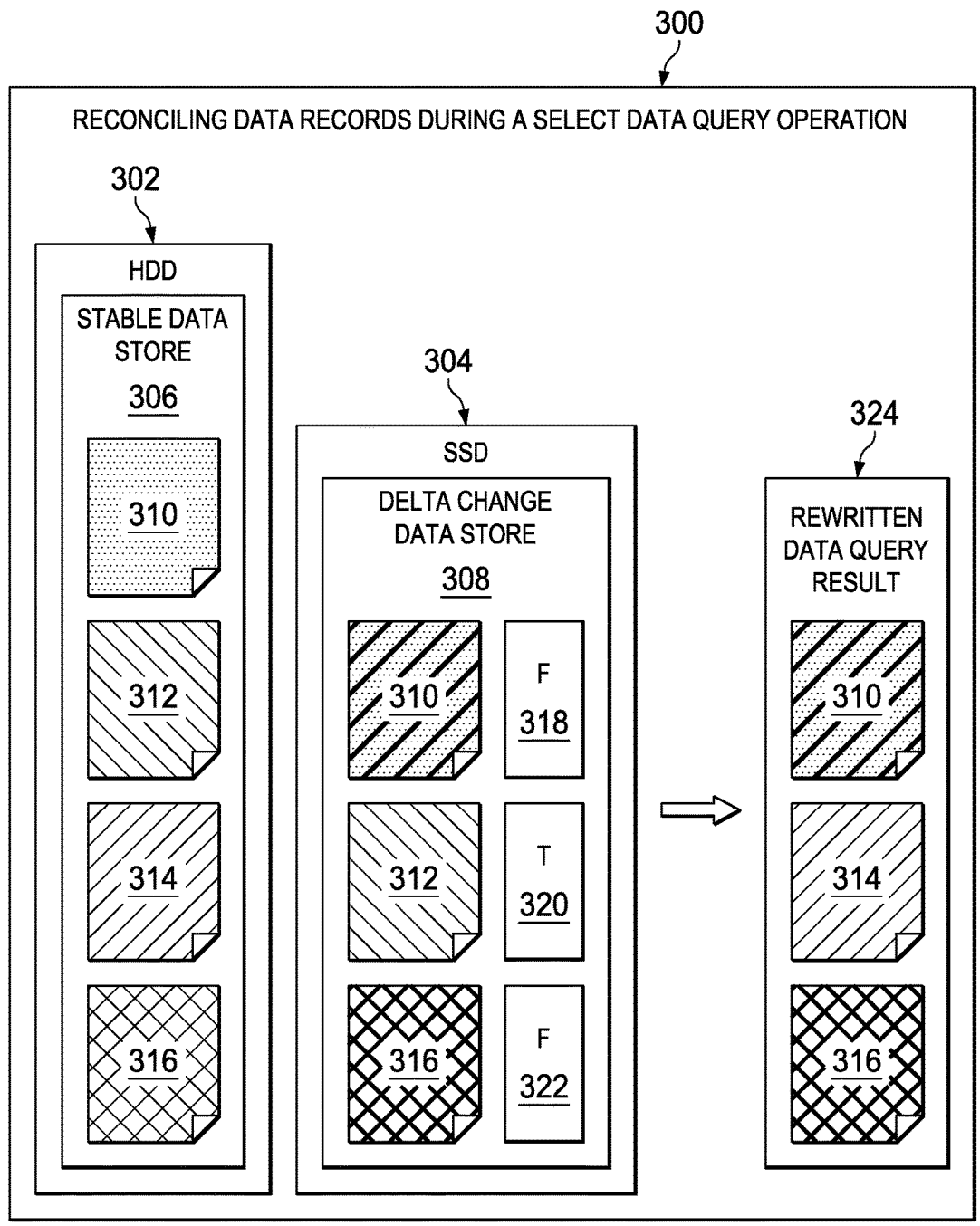
FIG. 3 is a diagram illustrating an example of reconciling data records during a select data query operation in accordance with an illustrative embodiment.

With reference now to FIG. 3, a diagram illustrating an example of reconciling data records during a select data query operation is depicted in accordance with an illustrative embodiment. Reconciling data records during a select data query operation 300 may be implemented in a computer, such as computer system 202 in FIG. 2. Reconciling data records during a select data query operation 300 utilizes hard disk drive 302 and solid-state drive 304. Hard disk drive 302 may be, for example, hard disk drive 208 in FIG. 2. Solid-state drive 304 may be, for example, solid-state drive 206 in FIG. 2.

In this example, hard disk drive 302 includes stable data store 306 and solid-state drive 304 includes delta change data store 308. Stable data store 306 and delta change data store 308 may be, for example, stable data store 212 and delta change data store 210 in FIG. 2, respectively. However, it should be noted that illustrative embodiments are not restricted to storing stable data store 306 on hard disk drive 302 and storing delta change data store 308 on solid-state drive 304. For example, alternative illustrative embodiments may store stable data store 306 on a different type of persistent data storage device, such as a magnetic tape drive. In addition, alternative illustrative embodiments may store delta change data store 308 on a different type of storage-class memory, such as a phase-change memory or an auto-commit memory.

Also in this example, hard disk drive 302 stores data records 310, 312, 314, and 316 within a table, such as table 134 in FIG. 1, in stable data store 306. Solid-state drive 304 stores updates to data records 310 and 316 within a table, such as table 124 in FIG. 1, in delta change data store 308. In addition, solid-state drive 304 stores a deletion of data record 312. It should be noted that illustrative embodiments extend solid-state drive 304 to include flags, such as delete flags 318, 320, and 322. Also, it should be noted that each flag corresponds to a particular data record. For example, delete flag 318 corresponds to data record 310, delete flag 320 corresponds to data record 312, and delete flag 322 corresponds to data record 316. Further, it should be noted that delete flag 318 corresponding to data record 310 is set to false (F), delete flag 320 corresponding to data record 312 is set to true (T), and delete flag 322 corresponding to data record 316 is set to false. In other words, delete flag 320, which is set to true, indicates that data record 312 is to be deleted or removed. Delete flags 318 and 322, which are set to false, indicate that data records 310 and 316 are not to be deleted or removed.

In this example assume that the computer received a data query to perform a select data query operation on data records 310-316. The computer rewrites the select data query using a predefined relational algebra rule that corresponds to the select data query. The rewritten select data query reconciles the data records stored on hard disk drive 302 with the data record changes stored on solid-state drive 304 based on each data record's corresponding delete flag setting. For example, in this illustration the computer reconciles data records 310 and 316 with the changes stored in delta change data store 308 and removes data record 312 because corresponding delete flag 320 is set to true. As a result, rewritten data query result 324 includes data record 314 and updated data records 310 and 316, but not removed data record 312. Rewritten data query result 324 may be, for example, a non-materialized view. A non-materialized view is a logical table-like structure populated on the fly by a given data query. The non-materialized view results of the given data query are not stored anywhere on disk and the non-materialized view is recreated every time the query is executed. Conversely, materialized views are actual data structures that are stored on disk.

Illustrative embodiments focus on rewriting the access to the table on stable data store 306 for a particular select data query by consolidating both the table on stable data store 306 and its corresponding deferred data update table on delta change data store 308. This merging of data record content of the table on stable data store 306 with its more recent data record updates stored on the deferred data update table on delta change data store 308 can be expressed in a relational algebra rewriting as for example:

$$R \Longrightarrow (R - \pi_R(R')) \cup \pi_R(\sigma_{isDeleted=False}(R')).$$

One subtlety in the above relational algebra rewriting rule is that the computer eliminates all data records that are to be deleted from stable data store 306. In other words, the computer only includes those data records within rewritten data query result 324 that have their corresponding delete flag set to false in delta change data store 308. Data query rewriting also is associative and composable with respect to other relational algebra operators, such as selection. Hence, data query rewriting forms the building block for mapping complex data queries that also may directly benefit from data query optimization, such as pushing-down the data record selections to stable data store 306.

Figure 4:
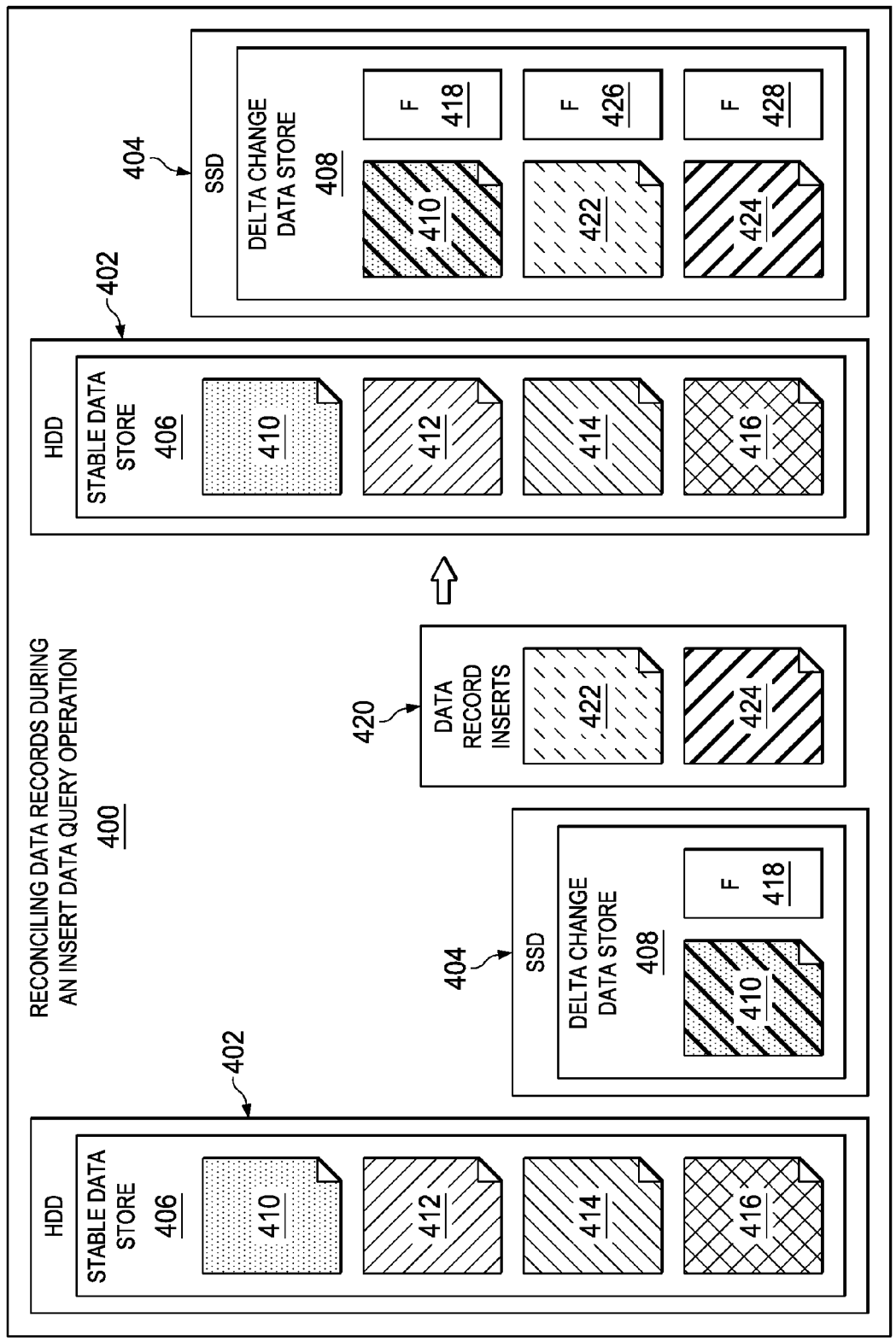
FIG. 4 is a diagram illustrating an example of reconciling data records during an insert data query operation in accordance with an illustrative embodiment.

With reference now to FIG. 4, a diagram illustrating an example of reconciling data records during an insert data query operation is depicted in accordance with an illustrative embodiment. Reconciling data records during an insert data query operation 400 may be implemented in a computer, such as computer system 202 in FIG. 2. Reconciling data records during an insert data query operation 400 utilizes hard disk drive 402 and solid-state drive 404. Hard disk drive 402 may be, for example, hard disk drive 208 in FIG. 2. Solid-state drive 404 may be, for example, solid-state drive 206 in FIG. 2.

In this example, hard disk drive 402 includes stable data store 406 and solid-state drive 404 includes delta change data store 408. Stable data store 406 and delta change data store 408 may be, for example, stable data store 212 and delta change data store 210 in FIG. 2, respectively. Also in this example, hard disk drive 402 stores data records 410, 412, 414, and 416 within a table, such as table 134 in FIG. 1, in stable data store 406. Solid-state drive 404 stores an update to data record 410 within a table, such as table 124 in FIG. 1, in delta change data store 408.

In this example assume that the computer received a data query to perform an insert data query operation on data record inserts 420. Data record inserts 420 include insertions of new data records 422 and 424. The computer rewrites the insert data query using a predefined relational algebra rule that corresponds to the insert data query, such as, for example:

$$R \leftarrow R \cup I \Longrightarrow R' \leftarrow R' \cup \pi_{R, isDeleted=False}(I) - (I \bowtie R).$$

The rewritten insert data query performs an insert operation for data records 422 and 424 on solid-state drive 404. As a result, solid-state drive 404 now includes updated data record 410 and newly inserted data records 422 and 424. It should be noted that delete flag 418 corresponds to updated data record 410, delete flag 426 corresponds to inserted data record 422, and delete flag 428 corresponds to inserted data record 424. Also, it should be noted that delete flags 418, 426, and 428 are set to false. In other words, delete flags 418, 426, and 428, which are set to false, indicate that corresponding data records 410, 422, and 424 are not to be deleted or removed.

Illustrative embodiments define the insert data query as simply adding a new set of one or more data records to an existing table. Since the set of data records to be inserted (e.g., data record inserts 420) is the most recent changes to the database, then illustrative embodiments add the set of data records to the table on solid-state drive 404 as opposed to the table on hard disk drive 402. In addition, illustrative embodiments set the delete flag corresponding to these newly inserted data records to false. Further, if any unique constraint exists on the table of hard disk drive 402, then illustrative embodiments also satisfy this constraint by removing any new data record in data record inserts 420 that already exists in the table.

Figure 5:
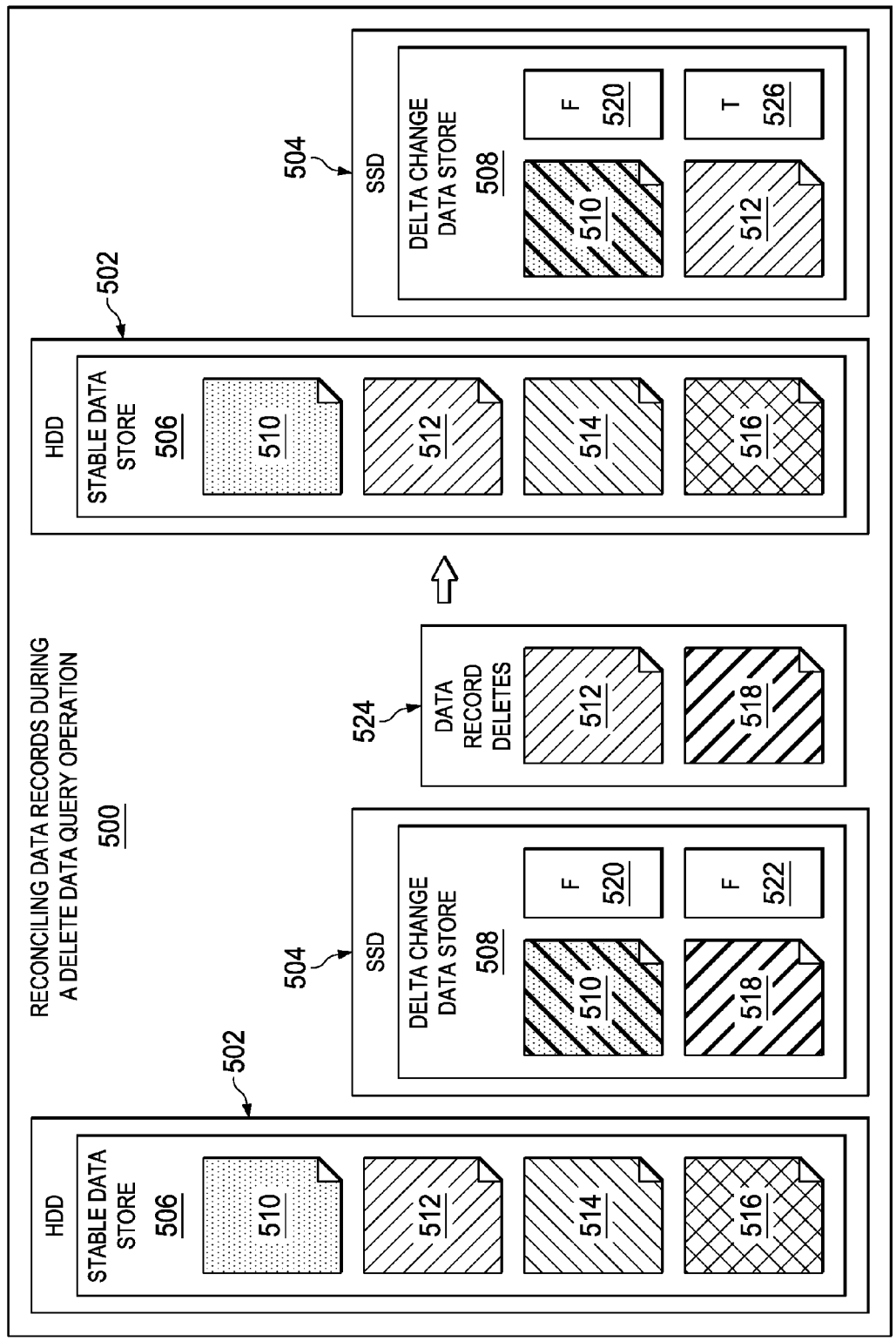
FIG. 5 is a diagram illustrating an example of reconciling data records during a delete data query operation in accordance with an illustrative embodiment.

With reference now to FIG. 5, a diagram illustrating an example of reconciling data records during a delete data query operation is depicted in accordance with an illustrative embodiment. Reconciling data records during a delete data query operation 500 may be implemented in a computer, such as computer system 202 in FIG. 2. Reconciling data records during a delete data query operation 500 utilizes hard disk drive 502 and solid-state drive 504. Hard disk drive 502 may be, for example, hard disk drive 208 in FIG. 2. Solid-state drive 504 may be, for example, solid-state drive 206 in FIG. 2.

In this example, hard disk drive 502 includes stable data store 506 and solid-state drive 504 includes delta change data store 508. Stable data store 506 and delta change data store 508 may be, for example, stable data store 212 and delta change data store 210 in FIG. 2, respectively. Also in this example, hard disk drive 502 stores data records 510, 512, 514, and 516 within a table, such as table 134 in FIG. 1, in stable data store 506. Solid-state drive 504 stores an update to data record 510 and recently inserted data record 518 within a table, such as table 124 in FIG. 1, in delta change data store 508. Delete flags 520 and 522 corresponding to data records 510 and 518, respectively, are set to false.

In this example assume that the computer received a data query to perform a delete data query operation on data record deletes 524. Data record deletes 524 include deletions of data records 512 and 518. The computer rewrites the delete data query using a predefined relational algebra rule that corresponds to the delete data query, such as, for example:

$$R \leftarrow R - D \Longrightarrow R' \leftarrow (R \cup \pi_{R, isDeleted=True}(D)) - (D \ltimes R).$$

The rewritten delete data query performs a delete operation on data record 512 on hard disk drive 502 and on data record 518 on solid-state drive 504. As a result of the delete operation, data record 518 is removed from solid-state drive 504. In other words, the computer never pushed recently inserted data record 518 to hard disk drive 502 and, therefore, removed it from solid-state drive 504. In addition, solid-state drive 504 now includes updated data record 510 and deleted data record 512. It should be noted that delete flag 526 corresponding to deleted data record 512 is set to true. In other words, delete flag 526 indicates that corresponding data record 512 is to be deleted or removed from hard disk drive 502 when the computer determines that it is time to push data records from solid-state drive 504 to hard disk drive 502.

The delete data query is similar to the insert data query except that illustrative embodiments tag the removed set of data records associated with the delete data query as deleted in solid-state drive 504. In other words, illustrative embodiments set corresponding delete flags of the removed set of data records to true. It should be noted that deleted data records should actually exist in the table of hard disk drive 502. Illustrative embodiments achieve this delete operation by performing an anti-join operation on hard disk drive 502. Verifying the existence of removed data records is an optimization, which is not necessary for proving the correctness of a delete operation.

Figure 6:
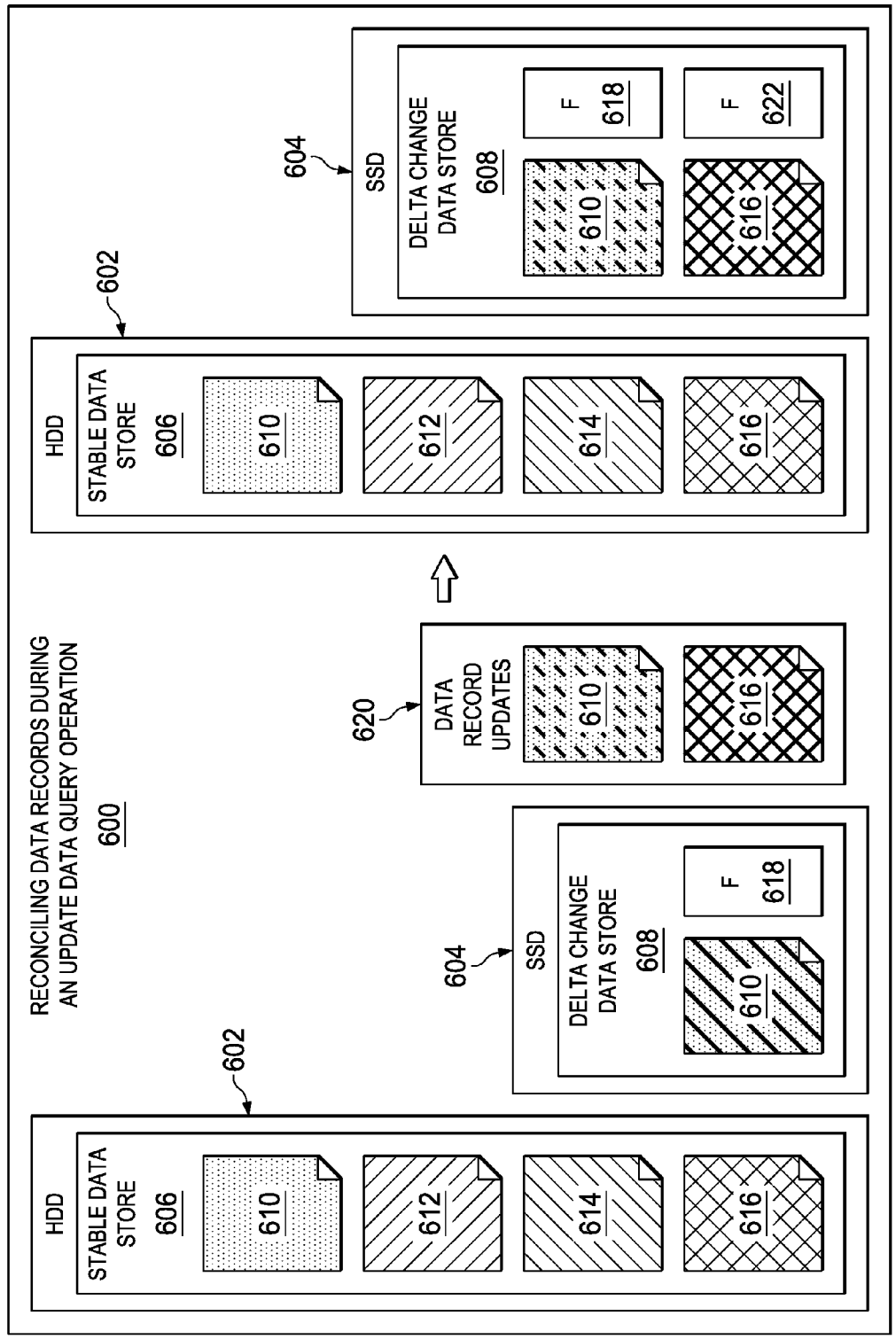
FIG. 6 is a diagram illustrating an example of reconciling data records during an update data query operation in accordance with an illustrative embodiment.

With reference now to FIG. 6, a diagram illustrating an example of reconciling data records during an update data query operation is depicted in accordance with an illustrative embodiment. Reconciling data records during an update data query operation 600 may be implemented in a computer, such as computer system 202 in FIG. 2. Reconciling data records during an update data query operation 600 utilizes hard disk drive 602 and solid-state drive 604. Hard disk drive 602 may be, for example, hard disk drive 208 in FIG. 2. Solid-state drive 604 may be, for example, solid-state drive 206 in FIG. 2.

In this example, hard disk drive 602 includes stable data store 606 and solid-state drive 604 includes delta change data store 608. Stable data store 606 and delta change data store 608 may be, for example, stable data store 212 and delta change data store 210 in FIG. 2, respectively. Also in this example, hard disk drive 602 stores data records 610, 612, 614, and 616 within a table, such as table 134 in FIG. 1, in stable data store 606. Solid-state drive 604 stores a recent update to data record 610 within a table, such as table 124 in FIG. 1, in delta change data store 608. Delete flag 618 corresponding to data record 610 is set to false.

In this example assume that the computer received a data query to perform an update data query operation on data record updates 620. Data record updates 620 include an update to recently updated data record 610 and an update to data record 616. The computer rewrites the update data query using a predefined relational algebra rule that corresponds to the update data query, such as, for example:

$$R \leftarrow R \cup U \Longrightarrow R' \leftarrow ((R' - \pi_{R, isDeleted=False}(U)) \cup \pi_{R, isDeleted=False}(U)).$$

The rewritten update data query performs an update operation on recently updated data record 610 and on data record 616. As a result of the update operation, solid-state drive 604 now includes updated data records 610 and 616. It should be noted that the computer removes the previous update to data record 610 and replaces it with the new or current update. Also, it should be noted that delete flag 622 corresponding to recently updated data record 616 is set to false. In other words, delete flag 622 indicates that corresponding data record 616 is not to be deleted or removed.

In order to capture the updated set of data records for the table on solid-state drive 604, assuming only the most recent version of each data record is stored on solid-state drive 604, the computer first removes any previous data record update entries associated with the set of updated data record from solid-state drive 604 followed by adding the new set of updated data record to solid-state drive 604. The computer may process the rewritten update data query in two steps, for example. In order to retain a complete history of each data record, the computer drops the first portion of the above predefined relational algebra rewriting rule and adds a set of additional attributes for tracking the different versions of a data record.

Figure 7:
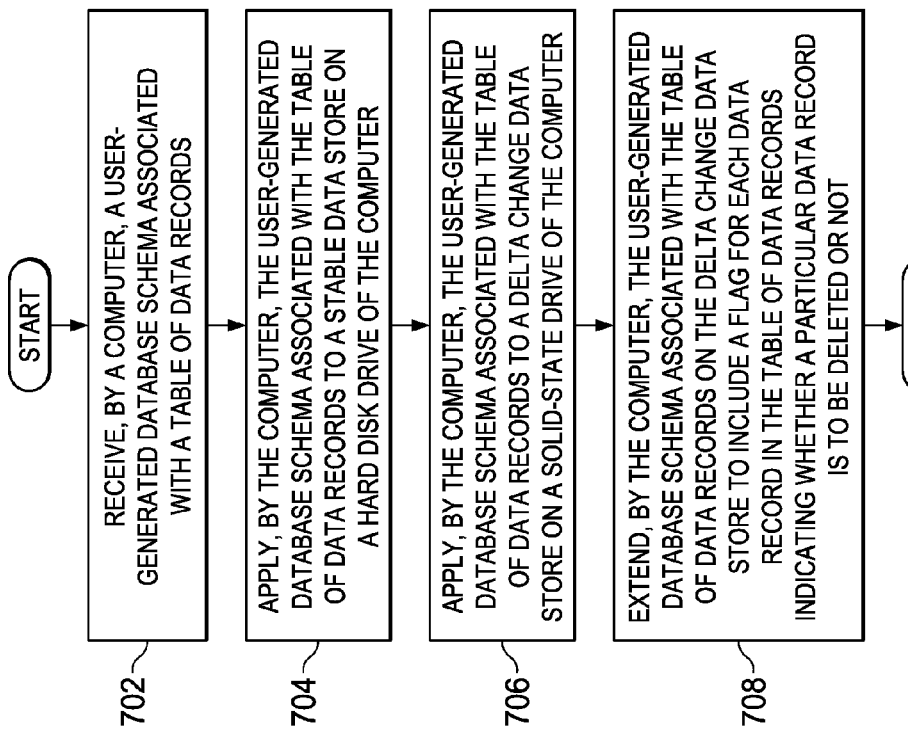
FIG. 7 is a flowchart illustrating a process for generating a database to store data records in accordance with an illustrative embodiment.

With reference now to FIG. 7, a flowchart illustrating a process for generating a database to store data records is shown in accordance with an illustrative embodiment. The process shown in FIG. 7 may be implemented in a computer, such as, for example, data processing system 100 in FIG. 1.

The process begins when the computer receives a user-generated database schema associated with a table of data records, such as, for example, user-generated database schema 120 associated with table 124 of data records 126 in FIG. 1 (step 702). After receiving the user-generated database schema in step 702, the computer applies the user-generated database schema associated with the table of data records to a stable data store on a hard disk drive of the computer, such as, for example, stable data store 132 on persistent storage 100 in FIG. 1 (step 704). In addition, the computer applies the user-generated database schema associated with the table of data records to a delta change data store on a solid-state drive of the computer, such as, for example, delta change data store 122 on storage-class memory 108 in FIG. 1 (step 706). Further, the computer extends the user-generated database schema associated with the table of data records on the delta change data store to include a flag for each data record in the table of data records, such as for example, delete flags 318-322 in FIG. 3, indicating whether a particular data record is to be deleted or not (step 708). Thereafter, the process terminates.

Figure 8:
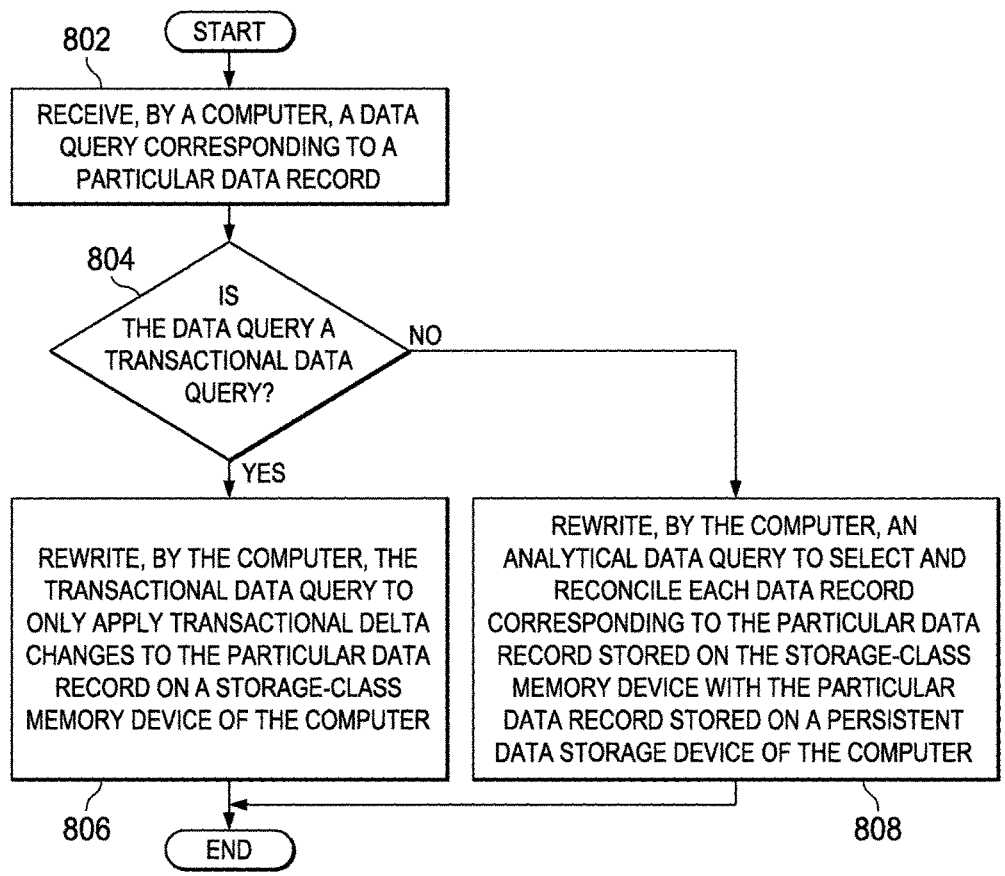
FIG. 8 is a flowchart illustrating a process for rewriting data queries in accordance with an illustrative embodiment.

With reference now to FIG. 8, a flowchart illustrating a process for rewriting data queries is shown in accordance with an illustrative embodiment. The process shown in FIG. 8 may be implemented in a computer, such as, for example, data processing system 100 in FIG. 1.

The process begins when the computer receives a data query, such as transactional data query 214 or analytical data query 216 in FIG. 2, corresponding to a particular data record (step 802). After receiving the data query in step 802, the computer makes a determination as to whether the data query is a transactional data query (step 804). If the computer determines that the data query is a transactional data query, yes output of step 804, then the computer rewrites the transactional data query to only apply transactional delta changes to the particular data record on a storage-class memory device of the computer, such as solid-state drive 206 of computer system 202 in FIG. 2 (step 806). Thereafter, the process terminates. If the computer determines that the data query is an analytical data query, no output of step 804, then the computer rewrites the analytical data query to select and reconcile each data record corresponding to the particular data record stored on the storage-class memory device with the particular data record stored on a persistent data storage device of the computer, such as hard disk drive 208 of computer system 202 in FIG. 2 (step 808). Thereafter, the process terminates.

Figure 9:
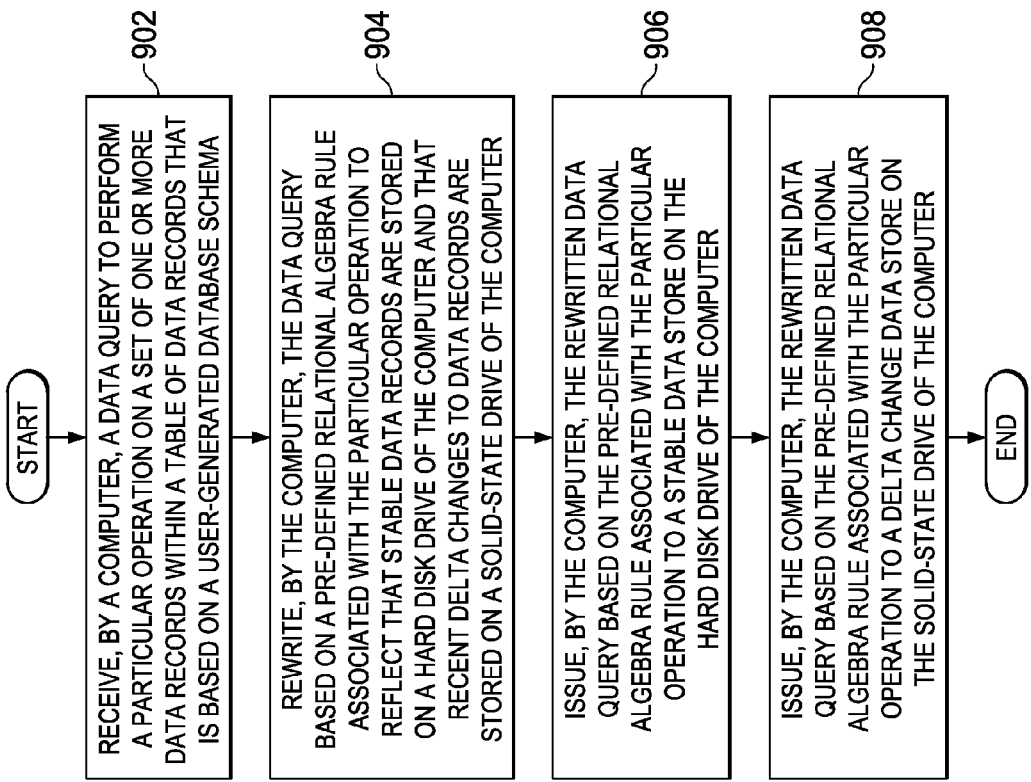
FIG. 9 is a flowchart illustrating a process for querying a database in accordance with an illustrative embodiment.

With reference now to FIG. 9, a flowchart illustrating a process for querying a database is shown in accordance with an illustrative embodiment. The process shown in FIG. 9 may be implemented in a computer, such as, for example, data processing system 100 in FIG. 1.

The process begins when the computer receives a data query, such as transactional data query 214 or analytical data query 216 in FIG. 2, to perform a particular operation on a set of one or more data records within a table of data records that is based on a user-generated database schema (step 902). The set of data records within the table of data records based on the user-generated database schema may be, for example, one or more of data records 126 within table 124, which is based on user-generated database schema 120 in FIG. 2. After receiving the data query in step 902, the computer rewrites the data query using, for example, query rewriting process 218 in FIG. 2, based on a pre-defined relational algebra rule associated with the particular operation to reflect that stable data records are stored on a hard disk drive of the computer and that recent delta changes to data records are stored on a solid-state drive of the computer (step 904). The pre-defined relational algebra rule may be, for example, one rule in pre-defined relational algebra rules 138 in FIG. 1. The hard disk drive and solid-state drive of the computer may be, for example, hard disk drive 208 and solid-state drive 206 of computer system 202 in FIG. 2.

Subsequent to rewriting the data query in step 904, the computer issues the rewritten data query based on the pre-defined relational algebra rule associated with the particular operation to a stable data store on the hard disk drive of the computer (step 906). For example, computer system 202 issues rewritten analytical data query 222 to stable data store 212 in FIG. 2. In addition, the computer issues the rewritten data query based on the pre-defined relational algebra rule associated with the particular operation to a delta change data store, such as delta change data store 210 in FIG. 2, on the solid-state drive of the computer (step 908). Thereafter, the process terminates.

Figure 10:
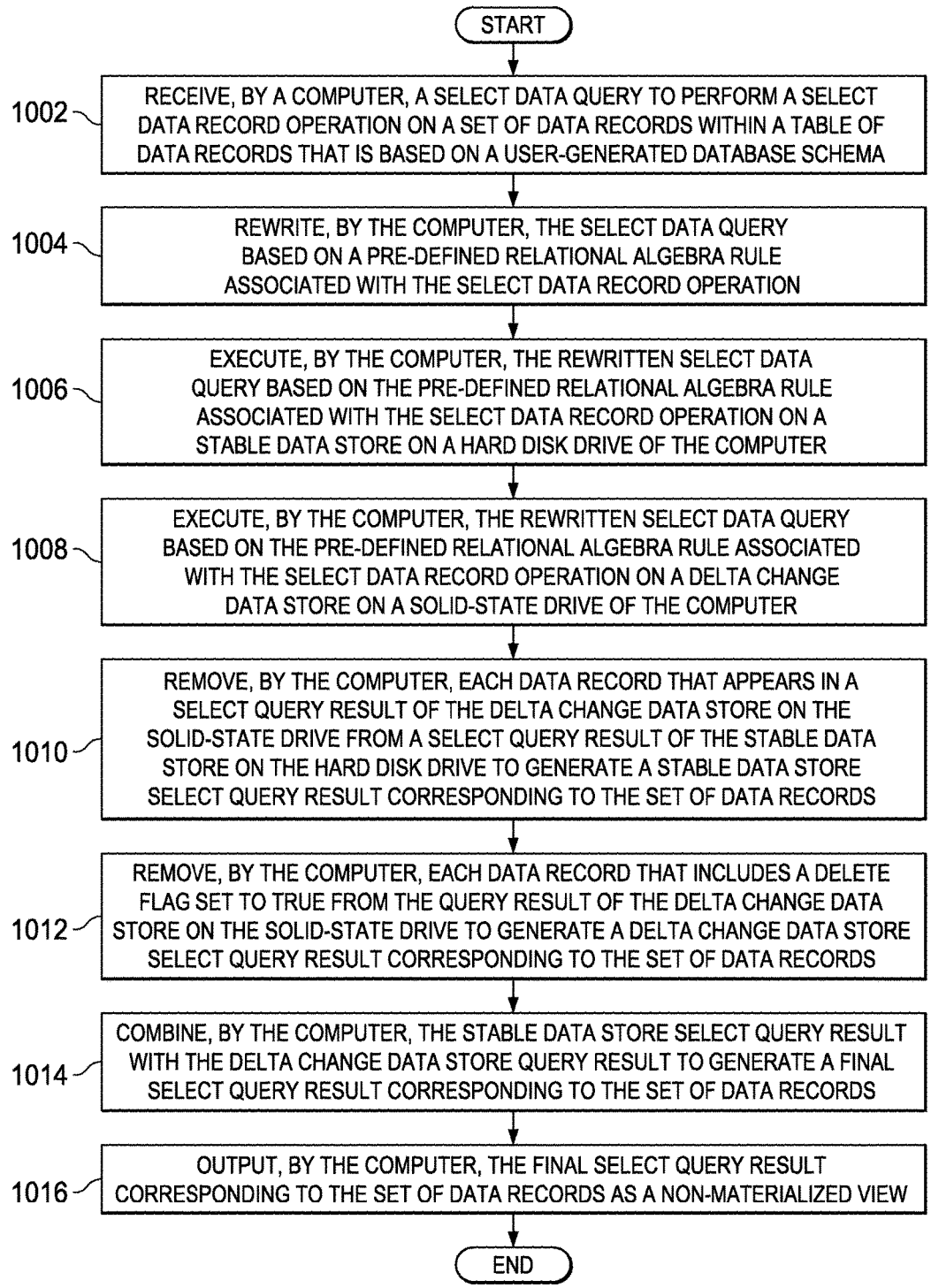
FIG. 10 is a flowchart illustrating a process for performing a select data query in accordance with an illustrative embodiment.

With reference now to FIG. 10, a flowchart illustrating a process for performing a select data query is shown in accordance with an illustrative embodiment. The process shown in FIG. 10 may be implemented in a computer, such as, for example, data processing system 100 in FIG. 1.

The process begins when the computer receives a select data query to perform a select data record operation on a set of data records within a table of data records that is based on a user-generated database schema (step 1002). Afterward, the computer rewrites the select data query based on a pre-defined relational algebra rule associated with the select data record operation (step 1004). Subsequently, the computer executes the rewritten select data query based on the pre-defined relational algebra rule associated with the select data record operation on a stable data store on a hard disk drive of the computer (step 1006). In addition, the computer executes the re-written select data query based on the pre-defined relational algebra rule associated with the select data record operation on a delta change data store on a solid-state drive of the computer (step 1008).

Then, the computer removes each data record that appears in a select query result of the delta change data store on the solid-state drive from a select query result of the stable data store on the hard disk drive to generate a stable data store select query result corresponding to the set of data records (step 1010). Further, the computer removes each data record that includes a delete flag set to true from the query result of the delta change data store on the solid-state drive to generate a delta change data store select query result corresponding to the set of data records (step 1012). Furthermore, the computer combines the stable data store select query result with the delta change data store query result to generate a final select query result corresponding to the set of data records, such as rewritten data query result 324 in FIG. 3 (step 1014). Then, the computer outputs the final select query result corresponding to the set of data records as a non-materialized view (step 1016). Thereafter, the process terminates.

Figure 11:
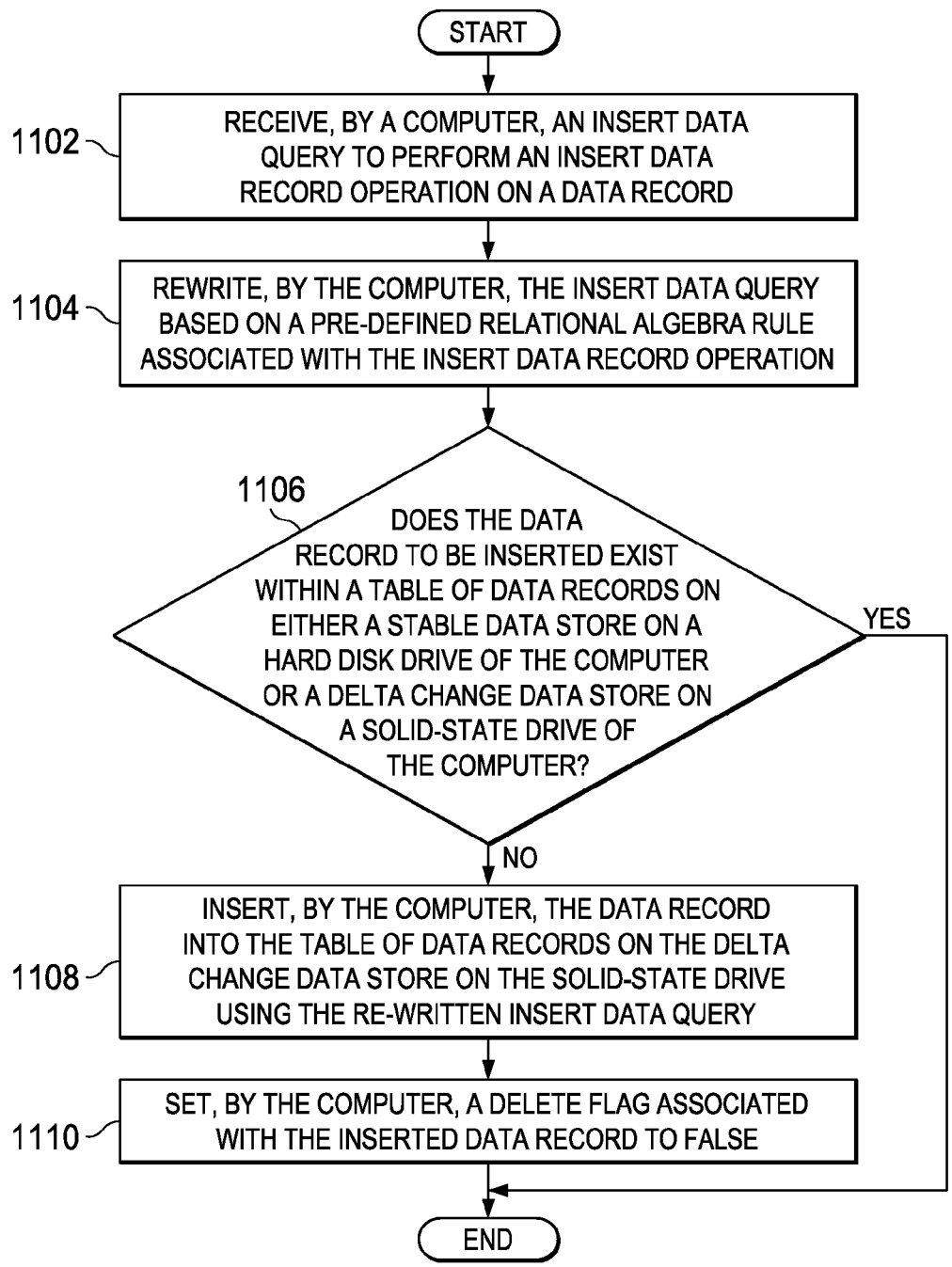
FIG. 11 is a flowchart illustrating a process for performing an insert data query in accordance with an illustrative embodiment.

With reference now to FIG. 11, a flowchart illustrating a process for performing an insert data query is shown in accordance with an illustrative embodiment. The process shown in FIG. 11 may be implemented in a computer, such as, for example, data processing system 100 in FIG. 1.

The process begins when the computer an insert data query to perform an insert data record operation on a data record (step 1102). Afterward, the computer rewrites the insert data query based on a pre-defined relational algebra rule associated with the insert data record operation (step 1104). Further, the computer makes a determination as to whether the data record to be inserted exists within a table of data records on either a stable data store on a hard disk drive of the computer or a delta change data store on a solid-state drive of the computer (step 1106).

If the computer determines that the data record to be inserted does exist within a table of data records on either a stable data store on a hard disk drive of the computer or a delta change data store on a solid-state drive of the computer, yes output of step 1106, then the process terminates thereafter. If the computer determines that the data record to be inserted does not exist within a table of data records on either a stable data store on a hard disk drive of the computer or a delta change data store on a solid-state drive of the computer, no output of step 1106, then the computer inserts the data record into the table of data records on the delta change data store on the solid-state drive using the rewritten insert data query (step 1108). In addition, the computer sets a delete flag associated with the inserted data record to false, such as delete flag 418 in FIG. 4 (step 1110). Thereafter, the process terminates.

Figure 12:
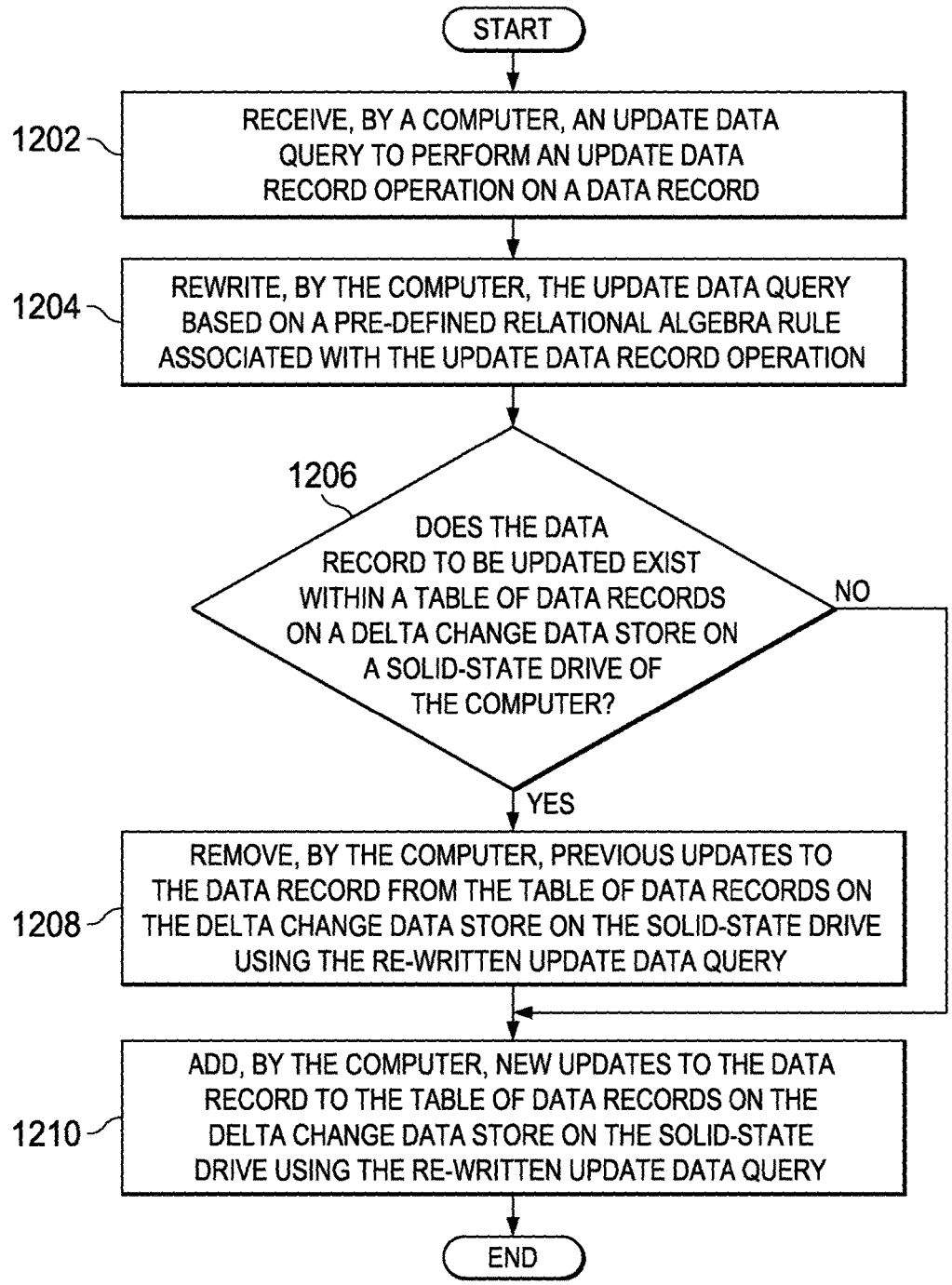
FIG. 12 is a flowchart illustrating a process for performing an update data query in accordance with an illustrative embodiment.

With reference now to FIG. 12, a flowchart illustrating a process for performing an update data query is shown in accordance with an illustrative embodiment. The process shown in FIG. 12 may be implemented in a computer, such as, for example, data processing system 100 in FIG. 1.

The process begins when the computer receives an update data query to perform an update data record operation on a data record (step 1202). Afterward, the computer rewrites the update data query based on a pre-defined relational algebra rule associated with the update data record operation (step 1204). Further, the computer makes a determination as to whether the data record to be updated exists within a table of data records on a delta change data store on a solid-state drive of the computer (step 1206).

If the computer determines that the data record to be updated does not exist within a table of data records on the delta change data store on the solid-state drive of the computer, no output of step 1206, then the process proceeds to step 1210. If the computer determines that the data record to be updated does exist within a table of data records on the delta change data store on the solid-state drive of the computer, yes output of step 1206, then the computer removes previous updates to the data record from the table of data records on the delta change data store on the solid-state drive using the re-written update data query (step 1208). In addition, the computer adds new updates to the data record to the table of data records on the delta change data store on the solid-state drive using the re-written update data query (step 1210). Thereafter, the process terminates.

Figure 13:
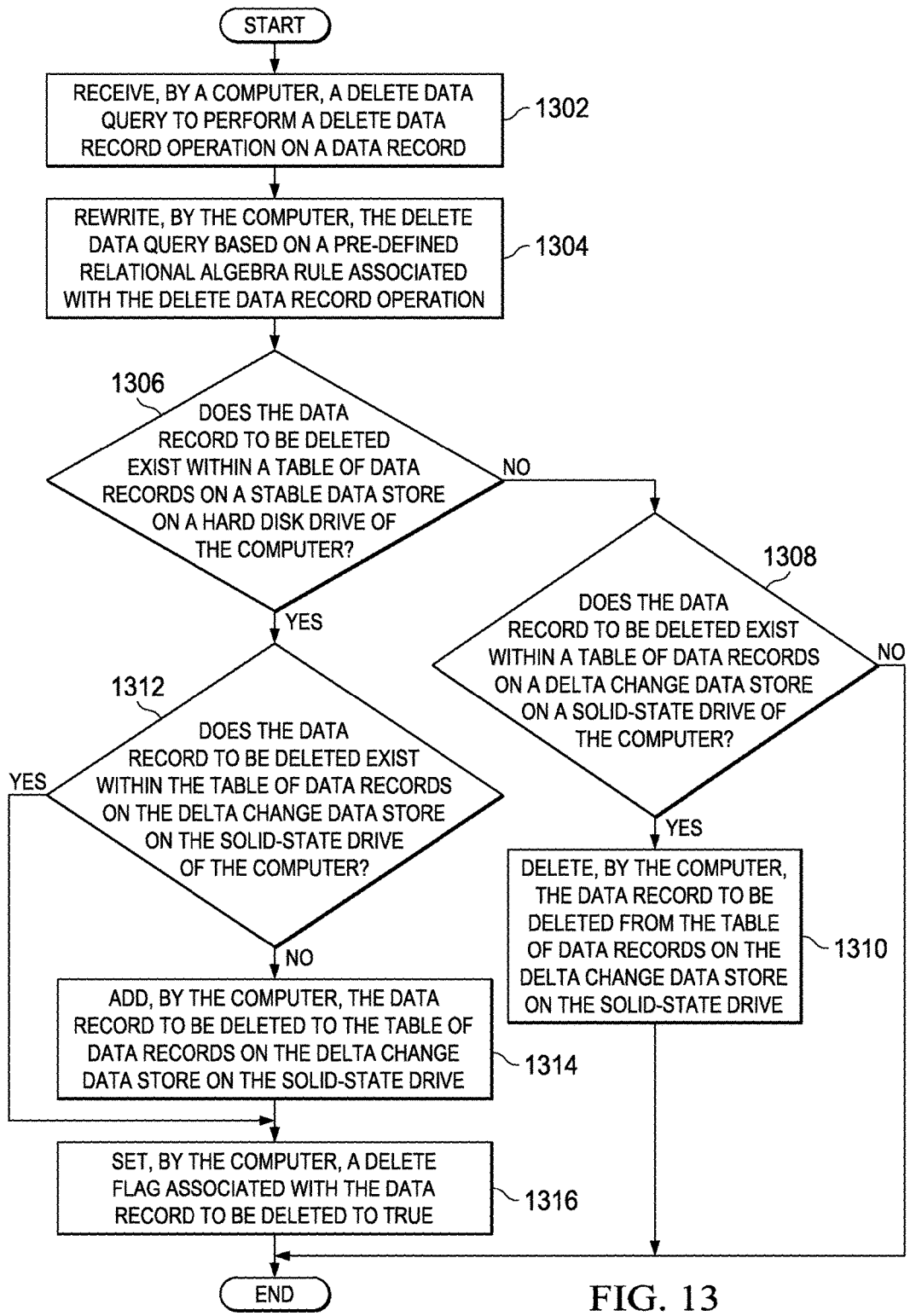
FIG. 13 is a flowchart illustrating a process for performing a delete data query in accordance with an illustrative embodiment.

With reference now to FIG. 13, a flowchart illustrating a process for performing a delete data query is shown in accordance with an illustrative embodiment. The process shown in FIG. 13 may be implemented in a computer, such as, for example, data processing system 100 in FIG. 1.

The process begins when the computer receives a delete data query to perform a delete data record operation on a data record (step 1302). Afterward, the computer rewrites the delete data query based on a pre-defined relational algebra rule associated with the delete data record operation (step 1304). Further, the computer makes a determination as to whether the data record to be deleted exists within a table of data records on a stable data store on a hard disk drive of the computer (step 1306).

If the computer determines that the data record to be deleted does not exist within a table of data records on the stable data store on the hard disk drive of the computer, no output of step 1306, then the computer makes a determination as to whether the data record to be deleted exists within a table of data records on a delta change data store on a solid-state drive of the computer (step 1308). If the computer determines that the data record to be deleted does not exist within a table of data records on the delta change data store on the solid-state drive of the computer, no output of step 1308, then the process terminates thereafter. If the computer determines that the data record to be deleted does exist within a table of data records on the delta change data store on the solid-state drive of the computer, yes output of step 1308, then the computer deletes the data record to be deleted from the table of data records on the delta change data store on the solid-state drive (step 1310). Thereafter, the process terminates.

Returning again to step 1306, if the computer determines that the data record to be deleted does exist within a table of data records on the stable data store on the hard disk drive of the computer, yes output of step 1306, then the computer makes a determination as to whether the data record to be deleted exists within a table of data records on the delta change data store on the solid-state drive of the computer (step 1312). If the computer determines that the data record to be deleted does exist within a table of data records on the delta change data store on the solid-state drive of the computer, yes output of step 1312, then the process proceeds to step 1316. If the computer determines that the data record to be deleted does not exist within a table of data records on the delta change data store on the solid-state drive of the computer, no output of step 1312, then the computer adds the data record to be deleted to the table of data records on the delta change data store on the solid-state drive (step 1314). In addition, the computer sets a delete flag associated with the data record to be deleted to true, such as delete flag 526 in FIG. 5 (step 1316). Thereafter, the process terminates.

Thus, illustrative embodiments provide a computer program product and computer system for staging data record changes from a faster storage medium to a slower storage medium using data query rewriting. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for staging data record changes from a faster storage medium to a slower storage medium using data query rewriting, the computer system comprising:
   a bus system;
   a storage device connected to the bus system, wherein the storage device stores computer readable program code; and
   a processor unit connected to the bus system, wherein the processor unit executes the computer readable program code to rewrite a data query to perform a particular operation on a particular data record based on a pre-defined relational algebra rule associated with the particular operation to reflect that stable data records are stored on a hard disk drive of the computer system and that recent changes to data records are stored on a solid-state drive of the computer system in response to receiving the data query, wherein the pre-defined relational algebra rule associated with the particular operation is one of a plurality of different pre-defined relational algebra rules, and wherein each different one of the plurality of different pre-defined relational algebra rules is associated with a different corresponding data query operation in a plurality of data query operations;
   and issue the rewritten data query based on the pre-defined relational algebra rule associated with the particular operation to a stable data store on the hard disk drive of the computer system and to a delta change data store on the solid-state drive of the computer system;
   wherein data record changes are deferred by storing recent data record changes entirely on the solid-state drive and only periodically merging the data record content of the solid-state drive with the data record content of the hard disk drive in batches;
   and wherein the plurality of different pre-defined relational algebra rules are selected from a group consisting of:

$R \Longrightarrow (R - \pi_R(R')) \cup \pi_R(\sigma_{isDeleted=False}(R'))$, $R \leftarrow R \cup I \Longrightarrow R' \leftarrow R \cup \pi_{R,isDeleted=False}(I) - (I \bowtie R)$, $R \leftarrow R - D \Longrightarrow R' \leftarrow (R \cup \pi_{R,isDeleted=True}(D)) - (D \triangleright R)$ and $R \leftarrow R \cup U \Longrightarrow R' \leftarrow ((R' - \pi_{R,isDeleted=False}(U))$.

2. The computer system of claim 1, wherein the processor unit further executes the computer readable program code to apply a user-generated database schema associated with database records to the stable data store on the hard disk drive of the computer system and to the delta change data store on the solid-state drive of the computer system in response to receiving the user-generated database schema, wherein the user-generated database schema is identical on both the stable data store of the hard disk drive and the delta change data store of the solid-state drive;
   wherein data record changes are staged from a faster storage medium to a slower storage medium using data query rewriting so that in response to the processor receiving a data query corresponding to a particular data record, the processor determines whether the data query is one of a transactional data query or an analytical data query and in response to the processor determining that the data query is a transactional data query, the computer rewrites the transactional data query to apply transactional delta changes to the particular data record on a storage-class memory and in response to the processor determining that the data query is an analytical data query, the computer rewrites the analytical data query to select and reconcile each data record corresponding to the particular data record stored on the storage-class memory with the particular data record stored on a persistent data storage device of the computer.

3. The computer system of claim 2, wherein the processor unit further executes the computer readable program code to extend the user-generated database schema applied to the delta change data store on the solid-state drive of the computer to include a flag for each data record stored in the delta change data store indicating whether a data record is to be deleted.

4. The computer system of claim 1, wherein the processor unit further executes the computer readable program code to rewrite a select data query to perform a select data record operation on a set of data records based on a pre-defined relational algebra rule of the plurality of different pre-defined relational algebra rules that is associated with the select data record operation in response to receiving the select data query;
   execute the rewritten select data query based on the pre-defined relational algebra rule associated with the select data record operation on the stable data store on the hard disk drive of the computer system and on the delta change data store on the solid-state drive of the computer system;
   remove each data record that appears in a select query result of the delta change data store on the solid-state drive from a select query result of the stable data store on the hard disk drive to generate a stable data store select query result corresponding to the set of data records;
   remove each data record that includes a delete flag set to true from the query result of the delta change data store on the solid-state drive to generate a delta change data store select query result corresponding to the set of data records;
   and combine the stable data store select query result with the delta change data store query result to generate a final select query result corresponding to the set of data records;
   wherein when the data record changes are deferred, the data record content of the solid-state drive and the data record content of the hard disk drive are strictly different and wherein query rewriting for select query operations expressed in relational algebra expressions minimizes the number of hard disk drive input/output accesses.

5. The computer system of claim 1, wherein the processor unit further executes the computer readable program code to rewrite an insert data query to perform an insert data record operation on a data record based on a pre-defined relational algebra rule associated with the insert data record operation in response to receiving the insert data query;
   insert the data record into the delta change data store on the solid-state drive using the rewritten insert data query in response to determining that the data record to be inserted does not exist on at least one of the stable data store on the hard disk drive of the computer system or the delta change data store on the solid-state drive of the computer system;
   and set a delete flag associated with the inserted data record to false on the solid-state drive of the computer system.

6. The computer system of claim 1, wherein the processor unit further executes the computer readable program code to rewrite an update data query to perform an update data record operation on a data record based on a pre-defined relational algebra rule of the plurality of different pre-defined relational algebra rules that is associated with the update data record operation in response to receiving the update data query;

remove previous updates to the data record on the delta change data store on the solid-state drive using the re-written update data query in response to determining that the data record to be updated does exist on the delta change data store on the solid-state drive of the computer system;

and add new updates to the data record to the delta change data store on the solid-state drive using the re-written update data query;

wherein a relational database schema on the solid state drive is defined such that for every table residing on the hard disk drive there is a corresponding table on the solid state drive;

and wherein when a data record on the solid-state drive has a corresponding flag indicating that the data record should be deleted, then the data record must be removed from the table on the hard disk drive if the data record exists on the hard disk drive.

7. The computer system of claim 1, wherein the processor unit further executes the computer readable program code to rewrite a delete data query to perform a delete data record operation on a data record based on a pre-defined relational algebra rule of the plurality of different pre-defined relational algebra rules that is associated with the delete data record operation in response to receiving the delete data query;

determine whether the data record to be deleted exists on the delta change data store on the solid-state drive of the computer system in response to determining that the data record to be deleted does not exist on the stable data store on the hard disk drive of the computer system;

and delete the data record to be deleted from the delta change data store on the solid-state drive in response to determining that the data record to be deleted does exist on the delta change data store on the solid-state drive.

8. The computer system of claim 7, wherein the processor unit further executes the computer readable program code to determine whether the data record to be deleted exists on the delta change data store on the solid-state drive of the computer system in response to determining that the data record to be deleted does exist on the stable data store on the hard disk drive of the computer system;

add the data record to be deleted to the delta change data store on the solid-state drive of the computer system in response to determining that the data record to be deleted does not exist on the delta change data store on the solid-state drive;

and set a delete flag associated with the data record to be deleted to true on the solid-state drive of the computer system.

9. A computer program product stored on a computer readable storage medium having computer readable program code encoded thereon that is executable by a computer for staging data record changes from a faster storage medium to a slower storage medium using data query rewriting, the computer program product comprising:

computer readable program code to rewrite a data query to perform a particular operation on a particular data record based on a pre-defined relational algebra rule associated with the particular operation to reflect that stable data records are stored on a hard disk drive of the computer and that recent changes to data records are stored on a solid-state drive of the computer in response to receiving the data query, wherein the pre-defined relational algebra rule associated with the particular operation is one of a plurality of different pre-defined relational algebra rules, and wherein each different one of the plurality of different pre-defined relational algebra rules is associated with a different corresponding data query operation in a plurality of data query operations;

and computer readable program code to issue the rewritten data query based on the pre-defined relational algebra rule associated with the particular operation to a stable data store on the hard disk drive of the computer and to a delta change data store on the solid-state drive of the computer;

wherein data record changes are staged from a faster storage medium to a slower storage medium using data query rewriting so that in response to the processor receiving a data query corresponding to a particular data record, the processor determines whether the data query is one of a transactional data query or an analytical data query and in response to the processor determining that the data query is a transactional data query, the computer rewrites the transactional data query to apply transactional delta changes to the particular data record on a storage-class memory and in response to the processor determining that the data query is an analytical data query, the computer rewrites the analytical data query to select and reconcile each data record corresponding to the particular data record stored on the storage-class memory with the particular data record stored on a persistent data storage device of the computer;

and wherein the plurality of different pre-defined relational algebra rules are selected from a group consisting of:

$$R \Longrightarrow (R-\pi_R(R')) \cup \pi_R(\sigma_{isDeleted=False}(R')),$$

$$R \leftarrow R \cup I \Longrightarrow R' \leftarrow R \cup \pi_{R,isDeleted=False}(I)-(I \bowtie R),$$

$$R \leftarrow R-D \Longrightarrow R' \leftarrow (R \cup \pi_{R,isDeleted=True}(D))-(D \triangleright R)$$
   and $$R \leftarrow R \cup U \Longrightarrow R' \leftarrow ((R'-\pi_{R,isDeleted=False}(U)).$$

10. The computer program product of claim 9, further comprising:

computer readable program code to apply a user-generated database schema associated with database records to the stable data store on the hard disk drive of the computer and to the delta change data store on the solid-state drive of the computer in response to receiving the user-generated database schema, wherein the user-generated database schema is identical on both the stable data store of the hard disk drive and the delta change data store of the solid-state drive;

wherein data record changes are deferred by storing recent data record changes entirely on the solid-state drive and only periodically merging the data record content of the solid-state drive with the data record content of the hard disk drive in batches.

11. The computer program product of claim 10, further comprising:

computer readable program code to extend the user-generated database schema applied to the delta change data store on the solid-state drive of the computer to include a flag for each data record stored in the delta change data store indicating whether a data record is to be deleted.

12. The computer program product of claim 9, further comprising:
computer readable program code to rewrite a select data query to perform a select data record operation on a set of data records based on a pre-defined relational algebra rule of the plurality of different pre-defined relational algebra rules that is associated with the select data record operation in response to receiving the select data query;
computer readable program code to execute the rewritten select data query based on the pre-defined relational algebra rule associated with the select data record operation on the stable data store on the hard disk drive of the computer and on the delta change data store on the solid-state drive of the computer;
computer readable program code to remove each data record that appears in a select query result of the delta change data store on the solid-state drive from a select query result of the stable data store on the hard disk drive to generate a stable data store select query result corresponding to the set of data records;
computer readable program code to remove each data record that includes a delete flag set to true from the query result of the delta change data store on the solid-state drive to generate a delta change data store select query result corresponding to the set of data records;
and computer readable program code to combine the stable data store select query result with the delta change data store query result to generate a final select query result corresponding to the set of data records;
wherein when the data record changes are deferred, the data record content of the solid-state drive and the data record content of the hard disk drive are strictly different and wherein query rewriting for select query operations expressed in relational algebra expressions minimizes the number of hard disk drive input/output accesses.

13. The computer program product of claim 9, further comprising:
computer readable program code to rewrite an insert data query to perform an insert data record operation on a data record based on a pre-defined relational algebra rule of the plurality of different pre-defined relational algebra rules that is associated with the insert data record operation in response to receiving the insert data query;
computer readable program code to insert the data record into the delta change data store on the solid-state drive using the rewritten insert data query in response to determining that the data record to be inserted does not exist on at least one of the stable data store on the hard disk drive of the computer or the delta change data store on the solid-state drive of the computer;
and computer readable program code to set a delete flag associated with the inserted data record to false on the solid-state drive of the computer.

14. The computer program product of claim 9, further comprising:
computer readable program code to rewrite an update data query to perform an update data record operation on a data record based on a pre-defined relational algebra rule of the plurality of different pre-defined relational algebra rules that is associated with the update data record operation in response to receiving the update data query;
computer readable program code to remove previous updates to the data record on the delta change data store on the solid-state drive using the re-written update data query in response to determining that the data record to be updated does exist on the delta change data store on the solid-state drive of the computer;
and computer readable program code to add new updates to the data record to the delta change data store on the solid-state drive using the re-written update data query;
wherein a relational database schema on the solid state drive is defined such that for every table residing on the hard disk drive there is a corresponding table on the solid state drive;
and wherein when a data record on the solid-state drive has a corresponding flag indicating that the data record should be deleted, then the data record must be removed from the table on the hard disk drive if the data record exists on the hard disk drive.

15. The computer program product of claim 9, further comprising:
computer readable program code to rewrite a delete data query to perform a delete data record operation on a data record based on a pre-defined relational algebra rule of the plurality of different pre-defined relational algebra rules that is associated with the delete data record operation in response to receiving the delete data query;
computer readable program code to determine whether the data record to be deleted exists on the delta change data store on the solid-state drive of the computer in response to determining that the data record to be deleted does not exist on the stable data store on the hard disk drive of the computer;
and computer readable program code to delete the data record to be deleted from the delta change data store on the solid-state drive in response to determining that the data record to be deleted does exist on the delta change data store on the solid-state drive.

16. The computer program product of claim 15, further comprising:
computer readable program code to determine whether the data record to be deleted exists on the delta change data store on the solid-state drive of the computer in response to determining that the data record to be deleted does exist on the stable data store on the hard disk drive of the computer;
computer readable program code to add the data record to be deleted to the delta change data store on the solid-state drive of the computer in response to determining that the data record to be deleted does not exist on the delta change data store on the solid-state drive;
and computer readable program code to set a delete flag associated with the data record to be deleted to true on the solid-state drive of the computer.

* * * * *